US011581020B1

(12) United States Patent
Hadap et al.

(10) Patent No.: US 11,581,020 B1
(45) Date of Patent: Feb. 14, 2023

(54) FACIAL SYNCHRONIZATION UTILIZING DEFERRED NEURAL RENDERING

(71) Applicant: Amazon Technologies, Inc., Seattle, WA (US)

(72) Inventors: Sunil Sharadchandra Hadap, Dublin, CA (US); Vimal Bhat, Redmond, WA (US); Abhinav Jain, Atlanta, GA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 17/217,221

(22) Filed: Mar. 30, 2021

(51) Int. Cl.
*G11B 27/036* (2006.01)
*G06V 40/16* (2022.01)

(52) U.S. Cl.
CPC .......... *G11B 27/036* (2013.01); *G06V 40/168* (2022.01); *G06V 40/174* (2022.01)

(58) Field of Classification Search
CPC ... G11B 27/036; G06V 40/174; G06V 40/168
See application file for complete search history.

(56) References Cited

U.S. PATENT DOCUMENTS

| | | | |
|---|---|---|---|
| 1,128,666 A * | 2/1915 | Haas et al. | B05C 1/08 118/400 |
| 9,196,074 B1 | 11/2015 | Bhat et al. | |
| 10,658,005 B1 | 5/2020 | Bogan et al. | |
| 11,151,702 B1 | 10/2021 | Tico et al. | |
| 2019/0082211 A1 | 3/2019 | Vats | |
| 2019/0172224 A1 | 6/2019 | Vajda et al. | |
| 2020/0029128 A1 | 1/2020 | Erskine | |
| 2020/0213680 A1 | 7/2020 | Ingel et al. | |
| 2022/0051485 A1 * | 2/2022 | Martin Brualla | G06T 19/20 |
| 2022/0130111 A1 * | 4/2022 | Martin Brualla | G06T 7/40 |

OTHER PUBLICATIONS

Bhat et al., "Person Replacement Utilizing Deferred Neural Rendering," U.S. Appl. No. 17/215,475, filed Mar. 29, 2021, 70 pages.

* cited by examiner

*Primary Examiner* — Mishawn N. Hunter
(74) *Attorney, Agent, or Firm* — Kilpatrick Townsend & Stockton LLP

(57) ABSTRACT

Techniques are disclosed for performing video synthesis of audiovisual content. In an example, a computing system may determine first facial parameters of a face of a particular person from a first frame in a video shot, whereby the video shot shows the particular person speaking a message. The system may determine second facial parameters based on an audio file that corresponds to the message being spoken in a different way from the video shot. The system may generate third facial parameters by merging the first and the second facial parameters. The system may identify a region of the face that is associated with a difference between the first and second facial parameters, render the region of the face based on a neural texture of the video shot, and then output a new frame showing the face of the particular person speaking the message in the different way.

20 Claims, 10 Drawing Sheets

FACIAL SYNCHRONIZATION UTILIZING DEFERRED NEURAL RENDERING

BACKGROUND

As multimedia distribution services are becoming more popular worldwide, there is increasing demand to make more content available that is tailored to particular regions. Some of these services have responded to this demand, for example, by providing more content with subtitles and/or dubbed audio. In another example, some services have re-shot videos by utilizing regional actors and/or actresses that are popular within the particular region. While these efforts may be somewhat helpful to make content more accessible to particular regions, there remain several challenges. In an example, re-shooting a video to include new actors and/or audio tracks may require significant computing resources.

BRIEF DESCRIPTION OF THE DRAWINGS

Various embodiments in accordance with the present disclosure will be described with reference to the drawings, in which.

DETAILED DESCRIPTION

Figure 1:
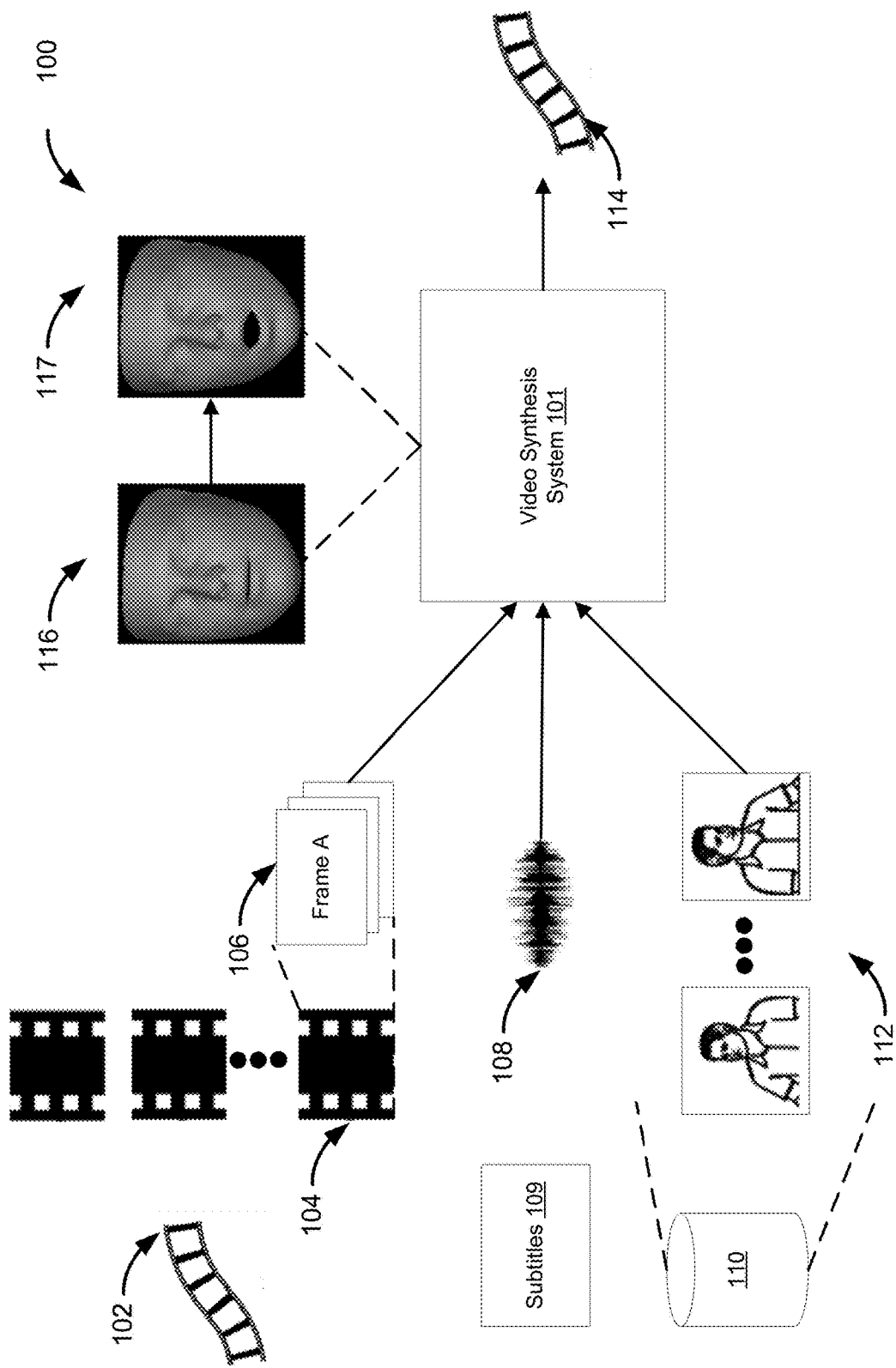
FIG. 1 is a schematic diagram illustrating an example system for a video synthesis system generating a synthesized video that incorporates new audiovisual content, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques for performing video synthesis of audiovisual content with new audiovisual content to generate a synthesized video. Consider a first example in which a video synthesis system automatically synchronizes the lips of an actor shown in a movie title with a dubbed audio content. In this first example, the video synthesis system receives a particular movie title (e.g., included within an MPEG-4 container) and an audio track file that includes dubbed audio for the particular movie title. The video synthesis system identifies a particular actor's face within a first frame of a particular shot (e.g., a sequence of frames between two cuts in the movie title). The video synthesis system then generates facial parameters (e.g., including facial shape, pose, and/or expression parameters) for a first three-dimensional (3D) model of the particular actor's face. Meanwhile, the video synthesis system also analyzes the dubbed audio and generates facial parameters (e.g., including facial expression parameters), which may be associated, among other regions of the face, with lip movements of the voice that spoke the dubbed audio. The video synthesis system then merges the facial parameters from the movie title (e.g., including shape and/or pose parameters) with the facial parameters derived from the dubbed audio (e.g., including at least facial expression parameters) to generate a second 3D model of the particular actor's face. This second 3D model may correspond to a representation of the same actor's face, whereby the lips of the actor's face now correspond to the lips of the face that spoke the dubbed audio at a point in time that corresponds to the first frame of the particular shot. The video synthesis system may then render and blend the second 3D model of the actor's face within the first frame (e.g., including performing deferred neural rendering utilizing a neural texture of the particular shot, described further herein). The video synthesis system may then output a second (e.g., updated) frame that replaces the first frame within the particular shot of the movie title. The video synthesis system may perform a similar process for other frames of the particular shot (and similarly, for other shots of the movie title), thus automatically generating a synthesized video that synchronizes lips of the particular actor shown in the video to the dubbed audio.

In a second example, consider a case in which the video synthesis system automatically generates a regional version of a movie video, whereby the face and body of an original actor in the video are replaced by the face and body of a regional replacement actor. In this second example, the video synthesis system may receive a movie title, similar to as described above. In this case, the video synthesis system may determine both face and body parameters for the original actor within a particular frame of a shot of the movie title. The video synthesis system may also determine both face and body parameters for the regional replacement actor, for example, based on a corpus of images and/or video of the regional replacement actor. The video synthesis system may then determine a 3D model of the replacement actor within the particular frame. In this example, the video synthesis system may also determine the 3D model based in part on a dubbed audio (e.g., corresponding to the voice of the replacement actor), which may be similar to as described in the first example. Upon determining the 3D model for the replacement actor, the video synthesis system may render and blend the 3D model of the replacement actor (e.g., including both face and body) within the particular frame, the result of which may be a new frame that replaces the particular (e.g., original) frame. Similar to the first example, this process may be repeated for each frame of each shot of the movie title, thus automatically generating a synthesized video that effectively replaces an original actor shown in the video with the regional replacement actor.

To further illustrate, consider a scenario in which a multimedia distribution service receives and/or maintains a collection of video titles (e.g., including movies, television (TV) shows, etc.). The multimedia distribution service selects a particular video title (e.g., a particular movie title) for distribution to one or more regions. For example, the particular video title may be a movie produced in the United States (U.S.), whereby the actors (and/or actresses) may speak in English. It should be understood that techniques described herein may be applicable to both actors and/or actresses, and therefore, the terms may be used interchangeably. The multimedia distribution service may determine to automatically generate a regional version of the movie, for example, for regional distribution in India.

In this example, a video synthesis system of the multimedia distribution service may receive the particular video title (e.g., an MP4 file that includes a video and audio track), for example, from a database of the multimedia distribution service. The video synthesis system may also receive one or more audiovisual contents to be used as input for automatically generating the regional version of the movie. For example, the video synthesis system may receive a dubbed audio track for the movie that corresponds to a voice (e.g., of a voice-over actor) speaking Hindi. In some embodiments, the video synthesis may also receive a subtitles file that includes subtitles corresponding to the text and/or indicates higher-level context associated with the speech of the dubbed audio. In this example, the video synthesis system may also receive a collection (e.g., a corpus) of images and/or videos that show a particular (e.g., well-known) regional actor in India.

The video synthesis system may then select a first frame of a particular (e.g., first) shot of the movie title. In this example, the shot may correspond to a sequence of frames taken from a single camera setup in a single scene (e.g., a sequence of frames between two cuts in the movie title). For example, the shot may correspond to a scene in the original U.S.-based movie whereby an English-speaking actor (e.g., a lead actor) walks in a foreground while talking to an audience in the background. The first frame may show at least a portion of the actor (in this example, also referred to as the "source person"), for example, including a source face portion (e.g., a straight-on shot capturing the front of the face, or a side view shot capturing the side of the face, etc.) and a source body portion (e.g., capturing the neck, torso, arms, and/or legs, etc.).

At this point, the video synthesis system may identify an identity of the source person shown in the first frame. For example, the video synthesis system may use facial recognition and actor identification to identify the lead actor within the frame. The system may also maintain a mapping (e.g., a pre-determined mapping) that maps the source person to a replacement target person. Accordingly, the video synthesis system may determine that the regional actor in India corresponds to the appropriate replacement for the source person shown in the video based on the determined identity. It should be understood that the operations for confirming the identity of the source person and/or confirming the replacement target person may be performed at any suitable time, for example, prior to generating a 3D model of each person.

The video synthesis system may then utilize a computer graphics technique to generate a 3D morphable model (3DMM) of the full body (e.g., including the source face portion and the source body portion) of the source person. This 3D model may be a parametric model, whereby the face expression, face shape, face pose, body shape, and/or body pose for the 3D model of the source person may be respectively expressed via one or more parameters. As described further herein, any one or more of these parameters may be modified to update a characteristic (e.g., face expression, face shape, etc.) of the 3D model of the source person. For more information about examples of 3D morphable models, see, for example, Bernhard Egger, et. al., *3D Morphable Face Models—Past, Present, and Future*, arXiv: 1909.01815v2 [cs.CV] 16 Apr. 2020; see also Tianye Li, et. a., *Learning a model of facial shape and expression from 4D scans*, ACM Transactions on Graphics, 11 Nov. 2017.

In this example, in addition to generating a 3D model of the source person shown in the first frame, the video synthesis system may also determine (e.g., extract) a high-dimensional neural texture (e.g., a texture space) of the particular shot that includes both color data (e.g., Red-Green-Blue (RGB) details) as well as structural data of the underlying 3D model (e.g., of the source person and/or other 3D objects captured in the particular shot). It should be understood that this neural texture may be generated based in part on data from one or more (e.g., all, or neighboring) frames in the particular shot that includes the first frame. In one example, a neural texture may correspond to one or more learned feature maps that are trained as part of a scene (e.g., shot) capture process. In some embodiments, neural textures may be stored as high-dimensional maps on top of 3D mesh proxies, whereby these maps may be interpreted by a deferred neural rendering pipeline, discussed further herein. For more information about generating neural textures and/or performing deferred neural rendering, see Justus Thies, et. al., *Deferred Neural Rendering: Image Synthesis using Neural Textures*, arXiv:1904.12356v1 [cs.CV] 28 Apr. 2019.

Continuing with the illustration above, the video synthesis system may further analyze the dubbed audio track for the movie to generate expression parameters that may subsequently be merged with parameters for a 3DMM of the target person. It should be understood that this process to generate expression parameters for the dubbed audio track may be performed in parallel (e.g., asynchronously) with generation of the 3DMM above, and/or in parallel with the generation of parameters for the target person (e.g., the regional actor), described further herein. To generate the expression parameters, the video synthesis may first extract and time-align phonemes from the dubbed audio and/or the corresponding subtitles. The system may then convert the phonemes to visemes, from which expression parameters may be generated. In one example, the expression parameters may be associated with, among other things, positions of the lips (e.g., pursed lips, smiling, frowning, the mouth being partially open, etc.). It should be understood that, as the dubbed audio track in this example corresponds to spoken Hindi, the corresponding expression parameters will correspond to lips voicing Hindi words, which may be different from expression parameters for the corresponding English words for the original movie title. In some embodiments, as described further herein, the subtitles may also (and/or alternatively) be used (e.g., in conjunction with the dubbed audio) to generate facial parameters.

Turning to the target person in further detail, as described above, the video synthesis system may receive a corpus of samples (e.g., images, videos) that show the particular regional actor (e.g., the "target person" or "target actor") in India who is to be a replacement for the source person (e.g., the source actor) within the movie title. The video synthesis system may utilize the corpus to generate another set of parameters for a 3DMM of the target person, for example, including, facial parameters and body parameters of the target person. This 3DMM for the target person may be generated similarly to as described above, in reference to the 3DMM for the source person.

At this point, the video synthesis system may generate facial parameters and body parameters for an updated 3D model of the target person based in part on merging (e.g., incorporating) one or more of the parameters described above. In this example, the video synthesis system may determine to retain a face pose of the source actor, while the face shape will correspond to the target actor's face. Also, the video synthesis system may retain the body pose from the source actor, while the body shape may correspond to the target actor's body. Accordingly, the video synthesis system may, for example, generate facial parameters by drawing from the previously determined face pose parameters of the 3D model of the source actor, and also by drawing from the face expression and face shape parameters of the 3D model for the target actor. The video synthesis system may, similarly, merge body parameters to generate an updated 3D model for the target actor. Also, the video synthesis system may incorporate the face expression parameters determined from the dubbed audio (and/or subtitles) into the updated 3D model. In this way, the video synthesis system may use 3D modeling to automatically replace the source actor within the frame with the target actor, while still retaining characteristics of the source actor (e.g., body pose, face pose) that may be relevant for communicating the narrative/story of the particular movie title and/or conforming with other regional requirements. The video synthesis system may also use 3D modeling to synchronize the lips of the target person with the dubbed audio. As described further herein, it should be understood that any suitable combination and/or inclusion/exclusion of parameters may be used to generate the updated 3D model for the target person.

Upon generating the parameters for the 3D model for the target person in the first frame of the particular shot, the video synthesis system may then render the target 3D model for the first frame. For example, the video synthesis system may perform deferred neural rendering based at least in part on the neural texture that was previously determined, as described herein. The deferred neural rendering may be used to form a photo-realistic image given the feature map that is obtained via the neural texture. This may include, for example, applying an appropriate color scheme to the 3D model of the target person. Because the neural texture may be generated based in part on data obtained from multiple frames of the particular shot (e.g., not only generated from the first frame), the deferred neural rendering may utilize this contextual knowledge of the shot (e.g., the collective sequence of frames of the shot) to render novel pixels for the 3D model of the target person in the first frame in an automated (e.g., parameterized) fashion.

For example, suppose that the updated expression parameters (e.g., derived from the dubbed audio) for this particular frame are such that the mouth is open and the teeth should be visible, whereas, in the original frame, the mouth was closed. In this example, even if the color scheme for the region corresponding to the lips of the original mouth were copied to the lips for the new model, there may still be artifacts present. For example, there may be a missing space since the mouth is now open instead of closed. However, suppose also that, in a neighboring source frame, the mouth of the source person (e.g., speaking English) was open and the teeth were visible. When performing the deferred neural rendering, the system may utilize the neural texture, generated from the collective frames of the shot, to render novel pixels (e.g., teeth data) for a particular frame (e.g., the first frame). For example, the system may utilize data associated with the teeth from the neighboring frame (e.g., teeth coloring, shape, etc.), and incorporate that teeth data for the first (e.g., current) frame, so that teeth are visible in the rendered frame. In some embodiments, characteristics of the source person (e.g., teeth coloring, body marks, etc.) may (or may not) be included in the rendering of the target person, based on the neural texture that is derived from the original shot. In some embodiments, the video synthesis system may further blend the rendered target person within the first frame, for example, to remove other artifacts associated with the target person from the frame. The blending may be performed utilizing the neural texture and/or via any suitable technique (e.g., Laplacian smoothing, deferred neural rendering). In another example, the deferred neural rendering may also use the neural texture to generate micro-expressions of the target face (e.g., a facial expression that briefly occurs within a region of the face, such as the brows, eyelids, cheeks, nose, or lips). In some embodiments, deferred neural rendering may be utilized to render (e.g., blend) not only the target person within the frame, but also re-render the frame to remove other artifacts. In at least these ways, the video synthesis system may effectively generate a photorealistic updated frame that replaces the source person with the target person.

As described further herein, one or more other techniques may be used alongside deferred neural rendering to effectively perform video synthesis of audiovisual content with new audiovisual content to generate a synthesized video. For example, utilizing the illustration above, the source actor walked in the foreground of the shot while talking to the audience of people in the background. In some embodiments, a technique may be used to replace one or more persons (e.g., the audience of people) with characters that, respectively, may not be associated with a known (e.g., real-life) person. This technique may be a different technique from the example described earlier that replaced the lead actor with the well-known regional actor in India. For example, one technique may utilize Generative Adversarial Networks to replace junior and background artists. This technique may be used in parallel with other techniques (e.g., deferred neural rendering) described herein. For more information about generative adversarial networks, see, for example, Goodfellow, et. al., Generative Adversarial Networks, arXiv:1406.2661v1 [stat.ML] 10 Apr. 2014.

In another example of a technique for performing video synthesis, and, utilizing the illustration above, the video synthesis system may ensure temporal cohesion between updated frames of a shot. For example, the video synthesis system may utilize optical flow algorithms and/or other temporal techniques (e.g., utilizing Kalman filters) to effectively smoothen (e.g., remove jitter effects) the movement of the target person as they are depicted as walking in the foreground of the shot in front of the background audience.

In this example, the video synthesis system replaced both the face (e.g., the face expression and shape) and the body (e.g., the body shape) of the source actor with the target actor. This also included ensuring that the lips of the target actor are synchronized to the dubbed audio. In some embodiments, any suitable subset of these replacements may be performed. For example, consider another case in which the multimedia distribution service determines to keep the same face and body of the source actor, but only to replace the voice with a dubbed voice (e.g., speaking Hindi). In this example, as described further herein, a 3D model of the face of the source actor may be generated, whereby only the face expressions (e.g., including lips, brows, cheeks, etc.) are subsequently updated to incorporate new face expressions that are derived from the dubbed audio.

Embodiments of the present disclosure provide several technical advantages over conventional techniques. For example, techniques described herein provide a more efficient process for automatically synthesizing audiovisual content to incorporate new audiovisual content (e.g., from dubbed audio, from one or more reference images, etc.). In one example, techniques described herein provide a more efficient process for automatically synchronizing a person's lips to a particular audio content (e.g., dubbed audio) that may be different from the original words being spoken by the person in the video. This process may include, among other operations, generating a new 3D model that incorporates the face expressions that are derived (e.g., computed) from the particular audio content, and then utilizing deferred neural rendering (e.g., based on a neural texture of an associated sequence of frames of a shot) to render and/or blend the new facial expressions within the frame. This process may enable a viewing experience that is closer to a native language experience (NLE), for example, ensuring that lip movements are in sync with words, intonations, and/or timbre of a dubbed voice, and/or timing the facial expressions to mirror the words in the dubbed audio track. This automated process may enable videos to be more efficiently customized for scalable regional distribution, thus appealing to a wide variety of audiences. This process may also reduce aggregate computing resources required, for example, to otherwise re-shoot one or more movie titles in a native language (e.g., across a large number of languages, and or video titles).

In another example, techniques described herein may provide a more efficient process for replacing a source person (e.g., a source actor) with a target person (e.g., a replacement actor) within a video title (e.g., a movie). For example, in addition to the lip synchronization described above, techniques may enable an efficient replacement of the face and/or body of the source actor, whereby the rendering process of the resultant frame (e.g., and associated shot) generates a synthesized shot that maintains temporal cohesion (e.g., reducing jitter) and mitigates against artifacts appearing in the shot. This process may also further enable videos to be more efficiently customized for scalable regional distribution, thus further appealing to a wide variety of audiences.

For clarity of illustration, embodiments described herein may typically refer to a multimedia distribution service context, in which a source movie is synthesized by synchronizing lips to a dubbed audio and/or replacing a source actor with a target actor. However, embodiments should not be construed to be so limited. For example, techniques herein may be applicable for any suitable video context (e.g., a TV show, a video shot from a mobile phone, etc.) in which frames of the video are automatically adjusted (e.g., re-rendered) to incorporate (e.g., synthesize) one or more types of other audiovisual content, whereby the resulting content minimizes artifacts and maintains temporal cohesion. Also, in the case of voice synchronization to a dubbed audio, it should be understood that the dubbed audio and/or the source video may correspond to any suitable content, and the synchronization may be performed within any suitable context. In one example, the source video (e.g., a home video recording) may contain audio content that is deemed inappropriate for a particular audience type (e.g., an inappropriate use of one or more words for a particular age group, such as children). In this example, the system may synchronize the video content with dubbed audio that uses appropriate words as a replacement.

FIG. 1 is a schematic diagram illustrating an example video synthesis system for generating a synthesized video that incorporates new audiovisual content, in accordance with various embodiments. In diagram 100 of FIG. 1, the example system includes a video synthesis system 101, one or more input files, and an output video file 114. The one or more input files include a video file 102 (e.g., a movie title), an audio file 108 (e.g., a dubbed audio file), a subtitles file 109, and one or more samples 112 (e.g., image samples, video samples, etc.) of a target person. These one or more input files may respective correspond to different types of audiovisual content. As described further herein, the video synthesis system 101 may receive any one or more of these types of audiovisual content, synthesize the contents with the video file 102, and then generate the output video file 114 that incorporates the synthesized content(s).

Turning to the input files in further detail, the video file 102 may correspond to any suitable container for a particular video content. Some non-limiting examples of video file formats may be MPEG-4 Part 14 ("MP4"), QuickTime ("MOV"), Audio Video Interleave ("AVI"), etc. Some non-limiting examples of video contents may include movies, TV shows, video advertisements, documentaries, home videos, etc. In some embodiments, the video file 102 may include both a video track and an audio track. In some embodiments, the video file 102 may not include an audio track. As described further herein, the video file 102 may be further customized (e.g., via video synthesis) for a specific region (e.g., a geographical region) and/or a particular audience (e.g., a particular customer type).

In an illustrative example, consider a scenario in which the video file 102 is a movie title. The movie title is originally produced in the U.S., and a multimedia distribution service (e.g., a video streaming service) operating the video synthesis system 101 may determine to generate a regional version of this movie title for streaming in a particular region (e.g., India). It should be understood that techniques described herein may enable auto-generation of any suitable number and/or type(s) of regional versions for a given video title. Continuing with the illustration above, suppose further that this movie title contains at least two lead actors, a first actor and a second actor, both of whom are well-known actors and speak in English in the original movie. In this example, the multimedia distribution service determines to utilize the video synthesis system 101 to automatically replace both the first actor and the second actor within the video file 102 (e.g., who may be respectively referred to herein as the "first source person" (or "first source actor") and the "second source person" (or "second source actor")) with two regional replacement actors, who may be well-known actors in India (e.g., the target region). The replacement actor for the first source person may be referred to as a first target person (or "first target actor"), and the replacement actor for the second source person may be referred to as the second target person (or "second target actor"). It should be understood that there may be any suitable number of persons (actors and/or actresses) within a video that may be candidates for automatic replacement, as described herein.

Continuing with the elements of diagram 100, the video file 102 may contain one or more shots. For example, shot 104 may represent a particular shot of a sequence of shots of the video file 102. In some embodiments, a shot may correspond to a plurality of video frames between two cuts in a video title. For example, a cut may correspond to a sequence of frames taken from a single camera setup for a single scene in a video (e.g., a movie). It should be understood that a first shot and/or a last shot in the video file 102 may only be separated by one shot from the other shots in the video. In the example of diagram 100, the shot 104 includes frame A 106 as one of the sequence of frames of the shot. Any individual frame of a shot may depict any suitable type of content. As described further herein, for any given frame in a shot, the context (and/or texture) for the frame may be associated with (e.g., and/or be determined at least in part from) neighboring frames of the shot.

For example, utilizing the illustration above, suppose that shot 104 depicts the first source person walking in the foreground while speaking a message to the second source person, who may also be engaged in dialogue with the first source person. In this example, frame A 106 may capture a particular point in time, for example, whereby the first source person has a particular body pose (e.g., using a particular hand gesture) and face pose (e.g., tilting the head forward). Additionally, the first source person may have a particular face expression (e.g., mouth open or closed, smiling, etc.), depending, for example, on the word being spoken at the point in time corresponding to frame A 106. As described further herein, the video synthesis system 101 may utilize a neural texture that incorporates characteristics of the neighboring frames (e.g., particular pixel color data and or three-dimensional structural data) of the shot to render an update for frame A that replaces the source actors with the target actors. This may be utilized, for example, to accurately render and/or blend a replacement 3D model of the replacement actor into the frame, so as to minimize artifacts and/or jitter in the frame.

Continuing with the illustration above, the multimedia distribution service may further determine that the original sound dialogue of the movie title, respectively spoken by both the source actors in English, should be replaced by Hindi dialogue, respectively spoken by the replacement actors. For example, an audio file including audio content (e.g., a dubbed audio) may be associated with each of the replacement actors. To further illustrate by utilizing diagram 100, the dubbed audio 108 may correspond to voice dialogue for a particular actor in the regional language (e.g., Hindi). The dubbed audio 108 may also be associated with metadata that indicates a time synchronization with video frames of one or more associated shots (e.g., shot 104) of the video. As described further herein, it should be understood that, as part of updating the video file 102 to replace the source actors with the target actors, the video synthesis system 101 may also ensure that the frames of the video title are updated such that the lips of each replacement actor are synchronized to the respective dubbed audio content. It should also be understood that there may be any suitable number of audio files (e.g., dubbed audio contents), for example, for each actor's dialogue that is being replaced (e.g., dubbed) with a different language.

In some embodiments, subtitles may also be used as input to the video synthesis system 101. For example, a subtitles file 109 may contain, among other things, a text-based transcript corresponding to the spoken Hindi recorded in one or more dubbed audio files (e.g., dubbed audio 108). In some embodiments, the subtitles file 109 may also contain higher level contextual information regarding a particular frame and/or shot. For example, suppose that in one regional context, a person may indicate agreement by nodding their head up and down. However, in another regional context, the person may indicate agreement by turning their head from left to right. In another example, a person may indicate surprise in one culture by pursing their lips together, while in another culture, the person might open their mouth wide. In some embodiments, any suitable cultural expressions and/or other normative regional behavior may be indicated within the subtitles file 109. This may be used by the video synthesis system 101, for example, to adjust one or more parameters of a 3D model of the replacement actor (e.g., face pose and/or expression parameters) within the frame (e.g., frame A 106) that is being tailored for the particular region.

In some embodiments, another type of input may be the samples 112 of the target person (e.g., target actor). For example, a repository 110 (e.g., a database) may store samples for one or more people (e.g., regional replacement actors). In some embodiments, a sample may include any suitable audiovisual content that may be utilized to synthesize a video (e.g., video file 102) with the audiovisual content. For example, a sample may include one or more images of a face or body of a target person, one or more video clips of the target person, etc. In some embodiments, as described further herein, these samples may be used to constructed a 3D model (e.g., a 3D morphable model (3DMM)) of the target person (e.g., including the face and body of the target person). In some embodiments, the samples may capture the target person from different angles and/or positions, for example, to capture the person with different lighting. It should be understood that the repository 110 may include respective samples for a plurality of different persons, for example, multiple target actors who are replacements for source actors in a movie title. In some embodiments, these samples may be obtained and/or stored in the repository in advance of performing techniques of the video synthesis system 101. In some embodiments, a 3DMM of a target person may also be generated at any suitable time, based on one or more samples of the target person.

Turning to the video synthesis system 101 in further detail, the video synthesis system 101 may be any suitable computer system (e.g., a computer device). For example, the video synthesis system 101 may include one or more computing devices (e.g., computing servers) within a cloud computing environment. The video synthesis system 101 may receive a video file (e.g., video file 102) and one or more inputs (e.g., one or more subtitles 109, one or more dubbed audio 108, one or more samples 112), and then synthesize the video file 102 to incorporate (e.g., combine) characteristics of the one or more inputs into the video, thus producing a modified video file.

It should be understood that different combinations of inputs (e.g., input files) may be utilized by video synthesis system 101, depending on what type of synthesizing is determined for the particular video.

For example, utilizing the illustration above, consider a first case in which the video synthesis system 101 receives instructions from the multimedia distribution service (e.g., another associated computing system) to synchronize the facial expressions of one or more actors of the video file 102, but to otherwise keep the identities of the actors the same. In this example, the video synthesis system 101 may receive the video file 102 and at least one dubbed audio 108 that corresponds to the dialogue for one of the actors in a regional language (e.g., Hindi, instead of English). In some embodiments, the subtitles 109 may also be included as input. As described further herein, the video synthesis system 101 may identify, for a particular frame in a given shot (e.g., shot 104) in the video file 102, the particular person (e.g., the particular actor) for which the dubbed audio 108 applicable for. For example, the video synthesis system 101 may identify the face of the particular person in a first frame (e.g., frame A 106), and then may generate first facial parameters for a first three-dimensional model 116 (e.g., a 3DMM) for the face of the particular person in frame A 106 of the shot 104. The video synthesis system 101 may also utilize at least the dubbed audio 108 (and/or the subtitles 109) to determine second facial parameters, for example, associated with expressions of the face that spoke the sounds (e.g., words) recorded by the dubbed audio 108. The video synthesis system 101 may generate third facial parameters for a second three-dimensional model 117 of the face shown in the frame A 106, based at least in part on merging (e.g., synthesizing) the first facial parameters and the second facial parameters. As depicted by the first 3D model 116 of diagram 100, suppose that the original frame showed the particular person speaking with their mouth closed in frame A 106. With the dubbed audio 108 (e.g., in Hindi) the particular person may have their mouth open, and thus, the second 3D model 117 shows the face of the particular person with their mouth open. As described further herein, it should be understood that various expressions of the face of a 3D model (e.g., brow expression, cheek expression, lip expression, etc.) may be controlled via any suitable facial expression parameters. In some embodiments, micro-expressions (e.g., brief facial expressions that may express a particular emotion) may also be expressed in a parameterized fashion via the 3D model.

Upon generating the second 3D model 117, the video synthesis system 101 may render a region associated with the second 3D model 117, for example, by performing deferred neural rendering. In some embodiments, as described herein, the video synthesis system 101 may perform deferred neural rendering by utilizing a neural texture generated from one or more (e.g., all) frames of the shot 104, some of which may be neighboring frames to frame A 106. In some embodiments, the rendering may be used to generate a photorealistic image, including coloring at least a portion of the face of the person (e.g., the identified region associated with a variability of expression of the face, such as the lips). In some embodiments, the video synthesis system 101 may further blend the rendered region of the second 3D model with the frame A 106, for example, based on the neural texture for the shot 104. This may include, for example, removing artifacts from the frame that may occur when replacing a region of the first 3D model (e.g., lips, brows, etc.) with the rendered region of the second 3D model. The video synthesis system 101 may then output a second frame that replaces the first frame (e.g., frame 106) of the particular shot (e.g., shot 104) of the video file 102. The second frame may show the face of the particular person speaking a message in the different language (e.g., Hindi, instead of English) and synchronized with the dubbed audio. The video synthesis system 101 may perform a similar process for other frames of the shot 104, and likewise, for other shots of the video file 102, thus outputting a synthesized video file 114 that is customized for a different region (e.g., India).

In another example, consider a second case in which the multimedia distribution service instructs the video synthesis system 101 to replace one or more actors in the video with replacement actors. In this case, instead of keeping the identity of the face of an actor the same, the face and/or body of the actor may also be replaced. In this example, one or more samples 112 from the repository 110 may be used to generate 3D models for one or more target actors, which may respectively be used to replace the source actor appearing in the original video. It should be understood that the previous example, whereby lips of a face may be synchronized to a dubbed audio, may also be applicable in this second case (e.g., thus, both replacing the source actor with a target actor and synchronizing the lips of the target actor with the dubbed audio). In some embodiments, the original audio may remain the same, and the target actor's lips may retain similar (e.g., the same) facial expressions as expressed via a 3D model of the source actor's face in the original shot of the video. Accordingly, it should be understood that any suitable combination of input files (e.g., audio contents, video contents) may be used to generate a synthesized video, depending on the intended output.

Figure 2:
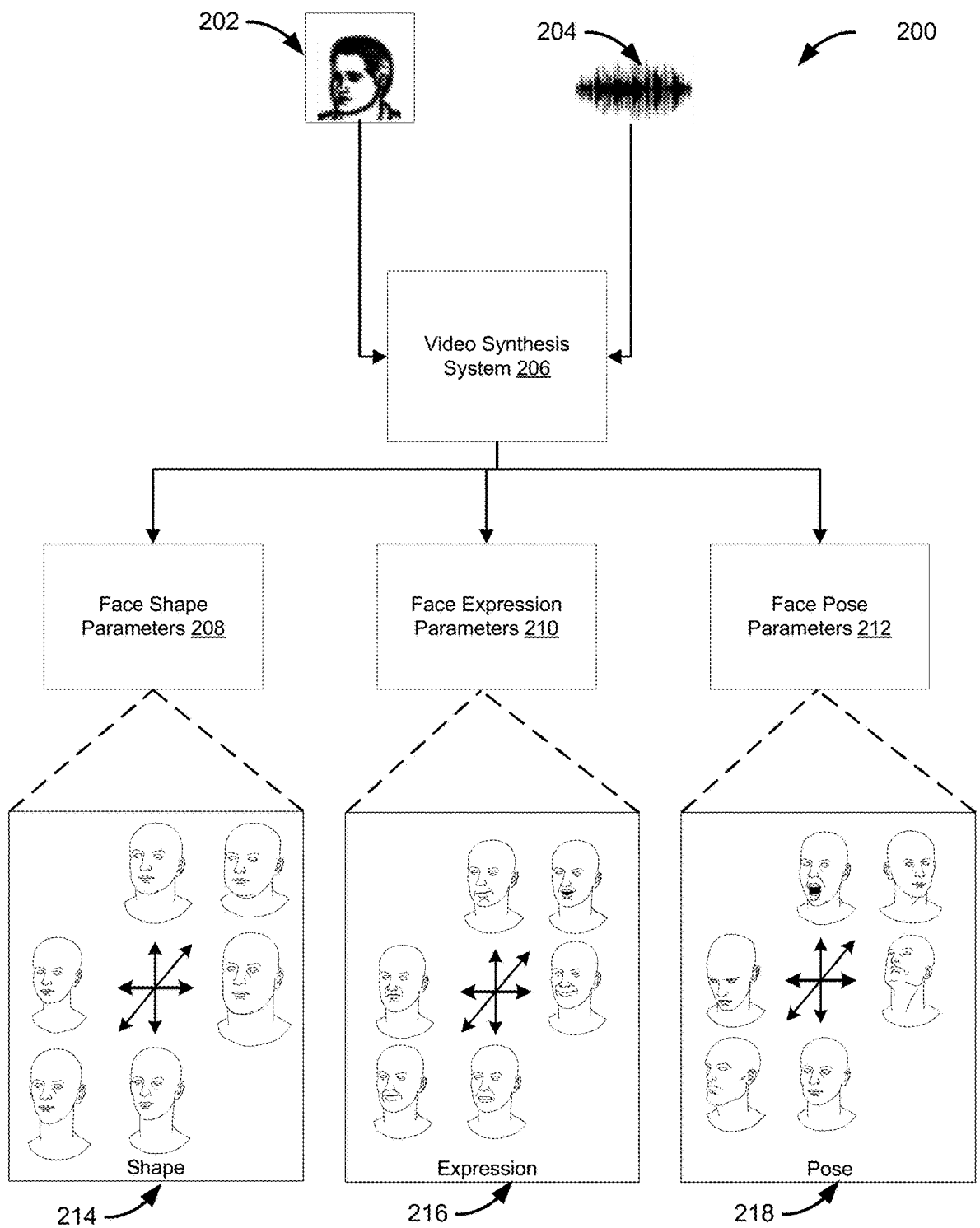
FIG. 2 illustrates an example technique for generating facial parameters of a three-dimensional model of a face of a particular person, in accordance with various embodiments.

FIG. 2 illustrates an example technique for generating facial parameters of a three-dimensional model of a particular person, in accordance with various embodiments. In diagram 200 of FIG. 2, a face 202 and a dubbed audio 204 are depicted. In some embodiments, the face 202 may correspond to an identified face portion (e.g., cropping) within a frame of a video shot (e.g., frame A 106 of shot 104 of FIG. 1). The dubbed audio 204 may be similar to the dubbed audio 108 of FIG. 1. The face 202 and/or the dubbed audio 204 may be input into a video synthesis system 206, which may be similar to any video synthesis system described herein (e.g., video synthesis system 101). As described further herein, one or more of these inputs may be utilized by the video synthesis system 206 to generate facial parameters of a face, whereby the facial parameters may include at least one of face shape parameters 208, face expression parameters 210, or face pose parameters 212.

To further illustrate, consider an example in which the face 202 is captured within a particular frame of a video shot. The face 202 may be captured at any suitable angle and/or environmental setting. For example, the face 202 may be captured straight-on or from a side angle. In another example, the face 202 may be captured in a well-lit room or in a darker room. In some embodiments, the face 202 of the particular frame may be captured within a particular video shot, whereby, the face shape, pose, and/or expressions may be continuously adjusted with each new frame. For example, a first frame may show the face 202 with the mouth open, and thus, the lips being separated from each other. A subsequent frame may show the face 202 with the mouth closed, and thus, the lip being pursed together.

In some embodiments, the video synthesis system 206 may utilize an algorithm to identify and/or localize the face 202 of the person within the particular frame. For example, a trained machine learning model may receive one or more frames of a shot as input. For each frame in the shot, the machine learning model may identify and localize a particular speaker. In some embodiments, a similar procedure may be performed for each shot in the video. For more information about an example model for detecting and/or localizing a particular speaker in a frame, see J. S. Chung, A. Zisserman, *Out of time: automated lip sync in the wild,*

*Workshop on Multi-view Lip-reading*, ACCV, 2016. It should be understood that any suitable algorithm may be utilized to detect and/or localize a particular speaker one or more frames of a shot.

Upon identifying and localizing the particular person (e.g., speaker) in the frame, the video synthesis system 206 may determine parameters for a 3D model of the particular person. For example, the video synthesis system 206 may execute an algorithm to generate a 3D morphable model (a 3DMM) of at least the face 202 of the particular person. As described further herein (e.g., with respect to FIG. 3), one or more algorithms may be utilized to generate a 3DMM for both the face and/or body of the particular person. Continuing with the example of FIG. 2, the 3DMM of the face 202 may be a parametric model that may be controlled (e.g., configured, and/or represented) by one or more parameters. In some embodiments, these facial parameters may include at least one of shape, pose, or expression parameters. Each of these may represent a category for a parameter type. For example, one or more face shape parameters 208 may be adjustable and may respectively indicate a characteristic of a shape of the face. In FIG. 2, various example face shapes 214 are depicted, for example, including a wider or more narrower face, an elongated face structure, etc. Additionally, one or more face expression parameters 210 may be adjustable and may respectively indicate different characteristics of face expressions (and/or micro-expressions). For example, a face may be smiling, frowning, neutral, etc., as depicted by example face expressions 216. It should be understood that parameters for a face expression may be associated with one or more parts (e.g., regions) of the face, including, for example, brows, cheeks, lips, eyes, etc. Similarly, one or more face pose parameters 212 may be adjustable and may respectively indicate different characteristics of face poses. As depicted by the example face poses 218, a face pose may correspond to a neck (e.g., and/or head) being turned to the left or right, so that the face is looking to the left or right. Another example face pose may have the neck tilted back (e.g., looking up), or tilted down. In some embodiments, the face pose be associated with an overall orientation of the face. In some embodiments, the face pose may be associated with a particular jaw position. It should be understood that one or more of the parameters in each category of parameters may be associated with one or more parameters in another category. For example, a position of a jaw of the face 202 may be associated with one or more face expression parameters (e.g., whether the lips are pursed together or separated from each other). In any case, the video synthesis system 206 may generate a set of parameters that collectively correspond to (e.g., provide specifications for) a 3D model of the face 202, such that a region of the 3D model of the face 202 may be subsequently rendered by the video synthesis system 206, as described further herein.

In some embodiments, the video synthesis system 206 may also determine facial parameters for the face 202 by utilizing information from one or more frames of the shot that neighbor the frame in which the face 202 is included. For example, as described herein, the video synthesis system 206 may identify and localize a particular person in each frame of a shot. The video synthesis system 206 may then utilize one or more temporal techniques (e.g., utilizing optical flow and/or Kalman filters) to estimate parameters for a particular frame based on one or more frames of the particular shot that are previous to the particular frame. For example, the video synthesis system 206 may utilize Kalman filters to estimate one or more parameters of the particular frame (e.g., associated with a current pose of the face) based in part on a position of the particular person (e.g., the face and/or body of the person) in the previous frame. By utilizing temporal techniques to maintain temporal cohesion across frames of a video shot, the video synthesis system 206 may reduce jitter across frames, which may otherwise exist if the video synthesis system 206 performed frame-by-frame parameter estimation (e.g., independent of other frames in the shot). As described further herein, the video synthesis system 206 may also generate a neural texture based on other (e.g., neighboring) frames of a given shot, which may subsequently be used to perform deferred neural rendering on a particular frame in the shot.

In another example for generating facial parameters, consider a case in which the video synthesis system 206 receives the dubbed audio 204. As described herein, the dubbed audio 204 may correspond to an audio file that includes audio content associated with at least one of the persons (e.g., actors) speaking in a video file (e.g., the video file that contains a frame showing the face 202 of an actor speaking in a particular shot). The audio content may be associated with the sounds (e.g., words, phrases, etc.) being spoken by the particular person shown speaking in the video file. In some embodiments, the audio content may correspond to a different language from what is spoken in the original video (e.g., Hindi, instead of English). In some embodiments, the language may be the same, but the voice may be that of a different person. In some embodiments, the voice that speaks in the dubbed audio 204 may that of the same person that speaks in the original video. In some embodiments, the dubbed audio 204 may be associated with a particular cadence that is time-aligned with the length of a particular shot (and/or sequence of shots) in a video file. In some embodiments, the dubbed audio 204 may be received in conjunction with any suitable metadata file that may be used to synchronize the dubbed audio 204 with the appropriate video file. As described herein, in some embodiments, the dubbed audio 204 may also be received with a subtitles file. The dubbed audio 204 and/or the subtitles file may be used by the video synthesis system 206 to determine one or more facial parameters.

For example, in some embodiments, the video synthesis system 206 may extract features based in part on the audio signal associated with the dubbed audio 204. In some embodiments, the video synthesis system 206 may utilize Mel-Frequency cepstral coefficients (MFCC) to determine the features (e.g., parameters) associated with the audio signal. In one example, the MFCC may be used as features that are input into a machine learning model (e.g., a neural network) that is trained to determine one or more expression parameters of the face that voiced (e.g., spoke) the sounds captured by dubbed audio 204. In some embodiments, the MFCC may be used to extract and time-align phonemes from the dubbed audio 204 and the corresponding subtitles. In some embodiments, a phoneme may correspond to a perceptually distinct unit of sound in a specified language that distinguishes one or from another. The video synthesis system 206 may then convert the phonemes to visemes. In some embodiments, a viseme may correspond to any of several speech sounds that look similar (e.g., the same) when lip reading. The video synthesis system 206 may then generate face expression parameters 210 based in part on the determined visemes, for example, utilizing a trained machine learning model. It should be understood that any suitable algorithm and/or technique may be used to generate face expression parameters from the dubbed audio 204. In some embodiments, the face expression parameters 210 generated from the dubbed audio 204 may be similar to as described above. For example, the face expression parameters 210 determined from the dubbed audio may indicate characteristics (e.g., positions and/or movements) of the lips, cheeks, brow, eyes, etc. In some embodiments, any one or more of these characteristics may be associated with a characteristic (e.g., quality) of the sound (e.g., phoneme) that is spoken in the dubbed audio 204. These characteristics may include, for example, the intonation and/or timbre (e.g., tone quality) of the sound, or any suitable perceived sound quality.

It should be understood that the face expression parameters determined from the dubbed audio 204 may be different from those determined from the face 202 within the video shot. This difference may correspond to a variability of expression between the face 202 in the original frame versus the face that spoke the dubbed audio 204 at a particular point in time that is time-aligned to the original frame. As described further herein, as part of synchronizing the lips of a face 202 to a dubbed audio 204, the video synthesis system 206 may identify one or more regions of the face (e.g., the brows, cheeks, eyes, etc.) to render and/or blend into the frame based in part on the variability of expression identified. Although embodiments described may primarily refer to the video synthesis system 206 utilizing the dubbed audio 204 to identify face expression parameters 210 (e.g., lip movements, cheek movements, etc.), it should be understood that any suitable facial parameters may be identified (and/or inferred) based on the dubbed audio 204, include face shape parameters 208 and/or face pose parameters 212. Any one or more of these parameters may also be used to adjust the parameters of the face 202 as part of synchronizing the lips of the face 202 to the dubbed audio 204, as described further herein. In some embodiments, the face expression parameters 210 of the facial parameters of the 3DMM of face 202 may be replaced, while the majority (e.g., all) of the face shape parameters 208 and/or face pose parameters 212 of the 3DMM of face 202 may remain intact. In some embodiments, this method of selectively replacing (e.g., merging) facial parameters may enable automatic lip synchronization with the dubbed audio 204, while still keeping other aspects of the person shown in the video intact (e.g., keeping the same identity of the person and/or a similar story narrative).

Figure 3:
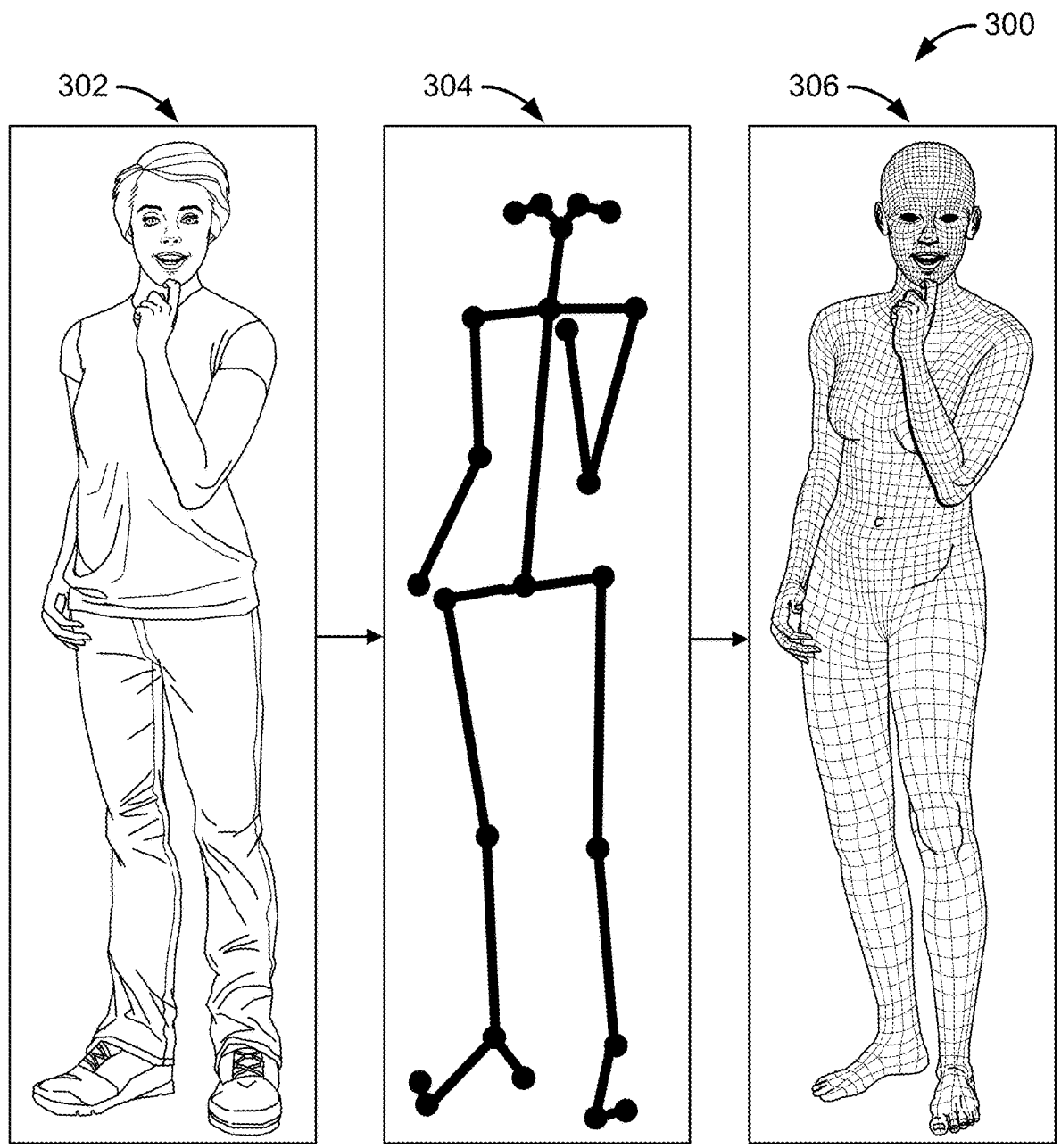
FIG. 3 illustrates an example technique for generating facial and/or body parameters of a three-dimensional model of a particular person, in accordance with various embodiments.
Figure 3:
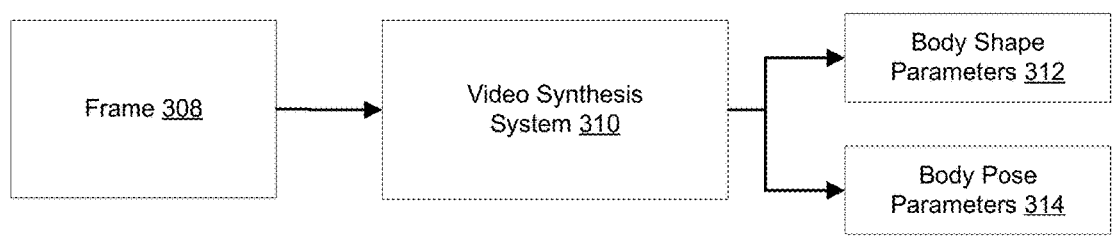

FIG. 3 illustrates an example technique for generating facial and/or body parameters of a three-dimensional model of a particular person, in accordance with various embodiments. In diagram 300 of FIG. 3, a person 302 is depicted. The person 302 may correspond to a localized portion of the person 302 captured within a particular frame (e.g., a first frame, such a frame 106 of FIG. 1) of a particular shot (e.g., shot 104) of a sequence of shots of a video file (e.g., video file 102). As described further herein, a video synthesis system (e.g., video synthesis system 310, which may be similar to any video synthesis system described herein) may generate a data structure that corresponds to (e.g., defines) the pose 304 for the body of the person 302. Then, based at least in part on the pose 304, the video synthesis system 310 may generate a 3D model 306 (e.g., a 3DMM) for the body of the person 302 that incorporates both the pose and shape of the body of the person 302.

For clarity of illustration, diagram 300 primarily describes the video synthesis system 310 generating a 3DMM model for the body of the person 302 depicted in the frame. However, it should be understood that the techniques described in reference to FIG. 2 (e.g., with regards to generating a 3DMM of the face 202 of the person in FIG. 2) may also be used with respect to the face of the person 302 in FIG. 3. Accordingly, techniques described herein may be used to generate parameters of 3D models (e.g., 3DMMs) of both the face and body of a person, whereby the parameters specify facial parameters and/or body parameters of the person.

Turning to FIG. 3 in further detail, and, as described above, consider an example in which the person 302 (e.g., including the face and/or body of the person 302) is captured within a particular frame 308 of a video shot. For example, the person 302 may be a source actor (e.g., a source person) within the video shot. Similar to the face 202 of FIG. 2, the person 302 may be captured at any suitable angle and/or environmental setting. For example, the person 302 may be captured straight-on, or from a side angle. In another example, only a portion of the person's body and/or face may be captured within the frame 308, for example, only showing the torso and face (e.g., but not the legs). Also, the face and/or body of the person 302 may be captured within a particular video shot, whereby aspects (e.g., characteristics) of the person 302 may be continuously adjusted with each new frame. For example, the body pose of the particular frame 308 (e.g., depicted by person 302) may show the person's elbow bent and making a hand gesture. In a subsequent frame of the video shot, the person's arm may be fully extended.

In some embodiments, instead of the person 302 being captured within the frame 308 of a video shot (e.g., as a source actor), the person 302 may be captured within any suitable image (and/or set of images). For example, consider a case in which the person 302 is a target person (e.g., a target actor) that is a candidate for replacing a source person in a video. In this case, the frame 308 may instead correspond to an image (e.g., one of the samples 112 of FIG. 1) of the target person drawn from the repository 110. It should be understood that techniques described herein with respect to generating parameters for a 3D model of a person (e.g., including the person's body and/or face) may be applicable to any suitable image types and/or source of images (e.g., and/or frames). In some embodiments, the 3D model for a replacement person (e.g., a target person) may be generated prior to generating the 3D model for the source person. For example, the repository 110 may include a set of pre-built mappings of parameters for 3D models for respective candidate persons. These pre-build mappings may be later used during runtime, when the video synthesis system 310 identifies and localizes a source person within a video, and then replaces the source person with a pre-built 3D model of the target person. It should be understood that the 3D models for source persons and/or target persons may be generated at any suitable time when performing techniques herein.

Turning to operations of the video synthesis system 310 in further detail, the system 310 may receive the frame 308 (e.g., or other suitable image) that shows the person 302, and then proceed to generate a 3D model (e.g., a 3DMM) for the person 302. For example, similar to as described with respect to FIG. 2, the video synthesis system 310 may utilize an algorithm to identify and/or localize the body (and/or face) of the person 302 within the particular frame. It should be understood that the given frame 308 may include one or more people (e.g., actors). Accordingly, in some embodiments, the video synthesis system 310 may determine an identity of the person (e.g., the source person) shown in the frame 308. In some embodiments, the video synthesis system 310 may determine to generate a 3D model for the person based on the determined identity. In some embodiments, as described herein, the video synthesis system 310 may determine that the identified person corresponds to particular source person for which a particular target person is a candidate replacement for the identified source person. In some embodiments, the identification of the person (e.g., a source person) and/or matching of the source person with the target person may be performed at any suitable time. For example, parameters for a 3D model for the source person (and/or target person) may be generated prior to determining that the particular target person is the replacement for the source person.

In this example, upon identifying and/or localizing the particular person 302 in the frame 308 (or image), the video synthesis system 310 may determine the pose 304 for the particular person 302. For example, the video synthesis system 310 may identify a particular points (e.g., key points) associated with the pose 304. Each point may correspond to a point on the body (and/or face) of the particular person, as depicted in FIG. 3 with respect to pose 304. For example, non-limiting examples of points may include, an ankle point, a knee point, a hip point, an elbow point, etc. In some embodiments, these points may be joined (e.g., connected) together, thus forming a body structure (e.g., a skeleton-like structure) that corresponds to the particular pose 304 of the person 302.

From this pose 304, a body shape may be determined (e.g., fitted) for the 3D model 306. This body shape may correspond to, for example, the musculature structure for the 3D model 306 that fits the skeletal structure, also including body fat, etc., as depicted by the 3D model 306 of FIG. 3. In some embodiments, the 3D model 306 may be associated with (and/or expressed by) parameters that may control (and/or define) the model. For example, the 3D model 306 may correspond to a parametric model that includes body parameters. The body parameters may include body shape parameters 312 and/or body pose parameters 314. In some embodiments, the body shape parameters 312 may include data corresponding to body muscle, body fat percentage and/or allocation, etc. The body pose parameters 314 may include details related to positions of one or more portions of the body (e.g., feet, legs, torso, arms, hands, neck, etc.), as illustrated in part by the pose 304 of FIG. 3. As described above, it should be understood that the video synthesis system 310 may also (and/or alternatively) generate facial parameters for the person 302, which may include at least one of face shape, face pose, or face expression parameters, as described with respect to FIG. 2. For more information about generating three-dimensional models (e.g., a three-dimensional morphable model), see, for example, George Pavlakos, et. al, *Expressive Body Capture: 3D Hands, Face, and Body from a Single Image*, arXiv:1904.05866v1 [cs.CV], Apr. 11, 2019; see also Tianye Li, et. a., Learning a model of facial shape and expression from 4D scans, ACM Transactions on Graphics, 11 Nov. 2017.

In some embodiments, similar to as described with respect to the facial parameters of FIG. 2, the video synthesis system 310 may determine body parameters by utilizing information from one or more frames of the shot that neighbor the frame 308 in which the person 302 is included. For example, the video synthesis system 310 may utilize one or more temporal techniques (e.g., utilizing optical flow and/or Kalman filters) to estimate parameters for a particular frame based on one or more frames of the particular shot that are previous to the particular frame. For example, suppose that the frame 308 is one of a sequence of frames of a video shot that shows the person 302 using their fingers to count. Accordingly, in a previous frame to frame 308, the person 302 may have no fingers being extended, and/or their arm may not be elevated with an bended elbow. The video synthesis system 310 may utilize information from a previous frame to estimate a future position of the present frame (e.g., frame 308), which may in turn be used as input for generating the 3D model 306. This may further be used to maintain temporal cohesion across frames of a video shot and reduce jitter across different frames. As described herein, the video synthesis system 310 may also generate a neural texture based on other (e.g., neighboring) frames of a given shot (e.g., that includes frame 308), which may subsequently be used to perform deferred neural rendering on a particular frame (e.g., frame 308) in the shot. In another example, the video synthesis system 310 may determine body parameters based on estimating a motion of a person within a video shot based on one or more frames of the video shot that are previous to the present frame. The video synthesis system 310 may then update parameters for a current pose of the person shown in the present frame based on the estimated motion.

In some embodiments, by utilizing a parametric model (e.g., a 3DMM) to express a 3D model of a source person's face and/or body, techniques described herein may enable a selective replacement (e.g., merging) of one or more characteristics of the source person with one or more characteristics of a target person. For example, as described further herein (e.g., with respect to FIG. 7), suppose that the video synthesis system 310 determines to replace the source person with target person, but otherwise keep the facial expressions, face pose, and body pose the same. In this case, the video synthesis system 310 may replace the face shape parameters and body shape parameters of the source person with respective parameters from the target person. The face expression, face pose, and/or body pose parameters of the source person may remain substantially the same. In another example, where the audio dialogue may be replaced by a dubbed audio, the face expression parameters (and potentially other facial parameters) may be replaced based on face expression parameters generated from the dubbed audio (e.g., as described with respect to FIG. 2). It should be understood that any suitable combination (e.g., merging) of parameters may be utilized to perform techniques described herein, depending on the desired video output.

Figure 4:
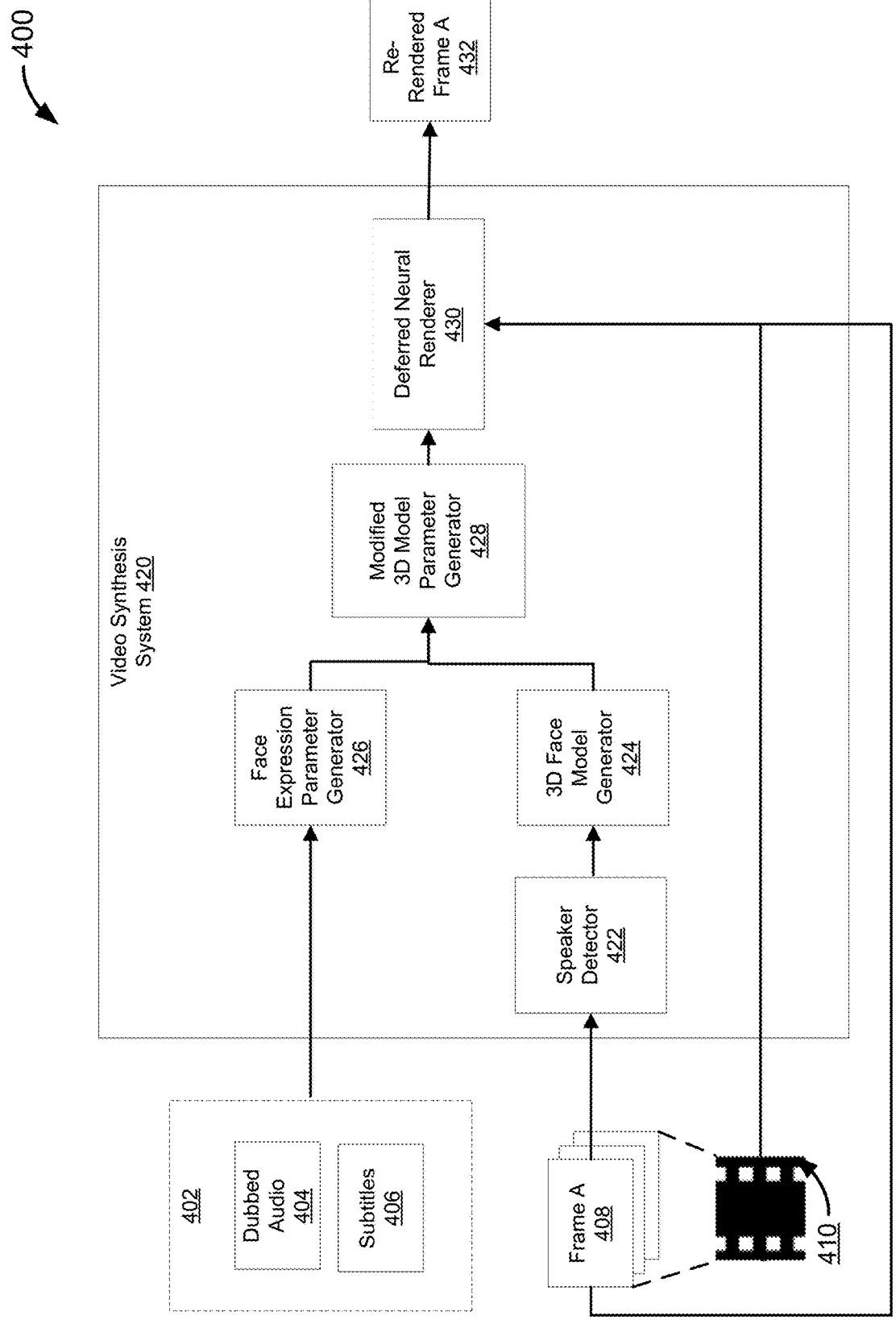
FIG. 4 illustrates an example architecture for generating a new video frame of a video that is synthesized with new audiovisual content, in accordance with various embodiments.

FIG. 4 illustrates an example architecture for generating a new video frame of a video that is synthesized with new audiovisual content, in accordance with various embodiments. In diagram 400 of FIG. 4, a video synthesis system 420 is depicted. In this example, the video synthesis system 420 receives as input one or more audio files 402 and at least frame A 408 of a video shot 410 (e.g., of a particular video file). The audio files 402 may include a dubbed audio 404 and subtitles 406, which may be similar to any of the dubbed audio and/or subtitles described herein (e.g., with respect to FIG. 2). It should be understood that techniques described herein, with respect to automatically synchronizing lips (and/or other facial expressions) in a frame to a dubbed audio, may be performed optionally with (or without) subtitles. As described further herein, the video synthesis system 420 may also receive a sequence of frames associated with the video shot 410, which may be utilized to generate a neural texture for the frame A 408 (and/or the shot 410).

As depicted by diagram 400, the video synthesis system 420 may include one or more modules (e.g., components) for implementing the features disclosed herein, including a speaker detector module 422, a 3D face model generator module 424, a face expression parameter generator module 426, a modified 3D model parameter generator module 428, and a deferred neural renderer module 320 (e.g., implementing a deferred neural rendering pipeline). Each of these components may executed within a pipeline for generating a re-rendered frame A 432 based in part on the inputs described above, whereby the re-rendered frame A 432 synchronizes at least the lips (e.g., among other facial characteristics) of a person in the frame A to the dubbed audio 404 and/or subtitles 406. It should be understood that any one or more operations performed by a particular module may also (and/or alternatively) be performed by another one or more modules described herein. To illustrate the operations performed by each of the components of the video synthesis system 420 in further detail, consider process 500 of FIG. 5.

Figure 5:
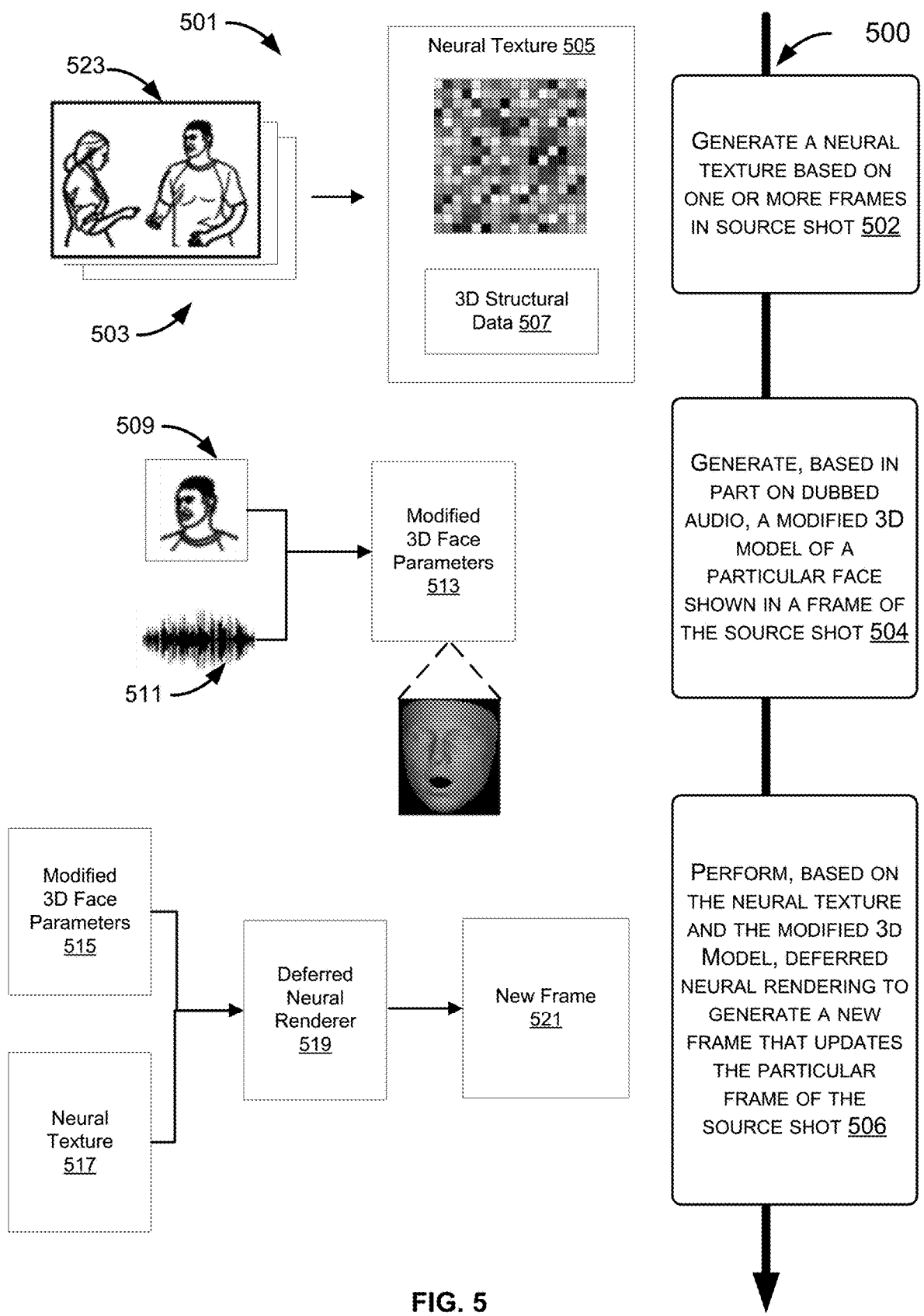
FIG. 5 illustrates an example technique for generating a new video frame of a video that is synthesized with new audiovisual content, in accordance with various embodiments.

FIG. 5 illustrates an example technique for generating a new video frame of a video that is synthesized with new audiovisual content, in accordance with various embodiments. The process 500 is an example high-level process for a video synthesis system (e.g., video synthesis system 420 of FIG. 4) generating a new frame of a video shot, whereby the face expressions (e.g., including at least the lip expressions) of a particular face shown in the shot are synchronized with a dubbed audio. The diagram 501 depicts example states that correspond to the blocks of the process 500. As described further herein, one or more modules of the video synthesis system 420 may be utilized to perform operations described in reference to the process 500 of FIG. 5.

At block 502, a video synthesis system may generate a neural texture based on one or more frames in a video shot. For example, using diagram 501 and video synthesis system 420 of FIG. 4 for further illustration, the video synthesis system 420 may receive video shot 503 as input (e.g., which may correspond to video shot 410 of FIG. 4). The video shot 503 may include frame 523 (e.g., which may correspond to frame A 408) as one of a sequence of frames of the video shot 503. The video synthesis system 420 may then utilize one or more of the frames of the shot 503 to generate a neural texture 505 of at least frame 523 of the shot 503. In some embodiments, the neural texture 505 may correspond to (and/or be generated from) one or more multi-dimensional maps of features. In some embodiments, the neural texture 505 may include color data and/or three-dimensional structural data 507 associated with one or more frames of the video shot 503. In some embodiments, because the neural texture 505 may store a map of features that are associated, not only with a particular frame (e.g., frame 523), but also with the video shot 503 as a whole (e.g., based in part on features learned from the sequence of frames of the video shot 503), the neural texture 505 may enable the video synthesis system 420 to render novel pixels for the particular frame in a parameterized (e.g., and/or automated) process, as described herein.

It should be understood that the operations of block 502 (e.g., to generate the neural texture 505) may be performed at any suitable point in time, whereby the neural texture 505 may be subsequently used to perform deferred neural rendering of a particular frame (e.g., at block 506, described further herein).

At block 504, the video synthesis system may generate, based in part on a dubbed audio, a modified 3D model of a particular face shown in a frame of the source shot. For example, the speaker detector module 422 of video synthesis system 420 may receive frame 523 and then localize and identify the particular face of a particular person shown in a portion 509 (e.g., a frame/image cropping) of the frame 523. In this example, the portion 509 may include the lips of the particular face, whereby the video shot 503 (e.g., in which the frame 523 is included) shows the particular person speaking a message in a particular way (e.g., speaking in a first language, such as English). Upon localizing and/or identifying the particular face, the 3D face model generator 424 may determine first facial parameters of a three-dimensional model (e.g., a 3DMM) of the particular face of the particular person from frame 523. The first facial parameters may include at least one of shape, pose, or expression parameters, for example, as described in reference to FIG. 2.

In some embodiments, the face expression parameter generator 426 of the video synthesis system 420 may also receive the dubbed audio 511 (e.g., within an audio file). In one example, the audio file may include audio content corresponding to the message (e.g., described at block 504) being spoken in a different way (e.g., speaking in a second language, such as Hindi). In some embodiments, the face expression parameter generator 426 may optionally receive a subtitles file. The face expression parameter generator 426 may generate second facial parameters based in part on the dubbed audio 511 within the audio file. For example, the second facial parameters may be similar to as described in reference to those generated from the dubbed audio 204 of FIG. 2. In some embodiments, the subtitles file may also be used to generate the second facial parameters. For example, the subtitles file may indicate sounds of the message being spoken in the different way (e.g., in the second language) according to a time cadence associated with the video shot 503. In some embodiments, the subtitles may be used to identify phonemes (and/or corresponding visemes) that correspond to words voiced within the dubbed audio 511. The phonemes (and/or corresponding visemes) may then be used to generate the second facial parameters, for example, via a trained machine learning model (e.g., a neural network). In some embodiments, the subtitles may indicate a regional context associated with the message being spoken in the different way. For example, the subtitles may indicate a particular facial expression (and/or pose) that may be used to convey additional context (e.g., a particular cultural context) associated with the message being spoken in the different way. In some embodiments, parameters associated with this facial expression (and/or pose) may be incorporated as part of the second facial parameters. It should be understood that the second facial parameters may include any suitable type of parameters, including, shape, pose, and/or expression parameters. For example, in addition to expression parameters associated with movement of the lips (and/or eye movement, cheek movement, brow movement, etc.) according to the dubbed audio 511, the second facial parameters may include pose parameters (e.g., a jaw position due in part to a head nodding, etc.).

Upon generating the first facial parameters and the second facial parameters, the modified 3D model parameter generator module 428 may generate third facial parameters for a second (e.g., a modified) three-dimensional model of the particular face of the particular person shown in a portion 509. In this example, the modified 3D model parameter generator module 428 may generate modified 3D face parameters 513 for expressing the second 3D model (e.g., a 3DMM) based in part on merging the second facial parameters with the first facial parameters. For example, in the case where the video synthesis system 420 receives programming instructions to automatically synchronize the lips (and/or other facial characteristics) of the particular person with the dubbed audio 511, the modified 3D model parameter generator module 428 may replace the face expression parameters of the first facial parameters with the face expression parameters of the second facial parameters. The modified 3D model parameter generator module 428 may determine to retain the face pose and/or face shape parameters of the first facial parameters, thereby retaining the same identity of the particular person (e.g., a known actor). As depicted in diagram 501, the third facial parameters for the second (e.g. modified) 3D model may correspond to the mouth of the particular person being open, for example as the mouth may voice a particular new phoneme (e.g., corresponding to the second language of the dubbed audio 511) at a particular point in time associated with the frame 523 of the video shot 503. It should be understood that any suitable merging (e.g., replacing, or otherwise mixing) of parameters may be utilized to perform embodiments, depending, for example, on the intended output (e.g., synchronizing to the dubbed audio 511, replacing the face of a source person with a new target person, etc.).

At block 506, the video synthesis system may perform, based at least in part on the neural texture (e.g., generated at block 502) and the modified 3D model (e.g., generated at block 504), deferred neural rendering to generate a new (e.g., modified) frame that updates the particular frame of the video shot. For example, as depicted in diagram 501, a deferred neural renderer 519 (e.g., which may be similar to the deferred neural renderer 430 of the video synthesis system 420) may receive the modified 3D face parameters 513. In some embodiments, the deferred neural renderer 430 may correspond to a pipeline that performs one or more operations (e.g., rendering and/or blending) to generate a photorealistic image (e.g., in terms of both coloring and structural representation) that incorporates the modified 3D model (e.g., expressed by the modified 3D face parameters 513) into the frame 523, thus generating a new frame 521 that is a photorealistic image. In some embodiments, the new frame 521 may be similar to the re-rendered frame A 432 of FIG. 4 (e.g., which itself may replace the original frame A 408 of FIG. 4).

Turning to operations of the deferred neural rendering pipeline in further detail, and, as described herein, the deferred neural renderer 519 may utilize the previously learned neural texture 505 that holistically captures the "essence" of the video shot 503. For example, the neural texture 505 may include color data and/or structural data associated with a texture space of the particular shot 503. In some embodiments, this neural texture 505 may be utilized by the deferred neural rendering pipeline to render an identified region (and/or regions). In some embodiments, the neural texture 505 may also be used to subsequently blend the rendered region with the frame 523. In some embodiments, the texture space of the neural texture 505 may be associated with (and/or indicate) one or more regions or characteristics of the face shown in the original video shot 503 (e.g., lip coloring, teeth coloring and/or shape, eye coloring and/or shape, etc.). In some embodiments, this texture space may be used to render one or more regions of the second 3D model (e.g., which is expressed by the modified 3D face parameters 513).

For example, in one embodiment, the video synthesis system 420 may identify a region of the second 3D model that is associated with a difference between the first facial parameters and the second facial parameters. For example, in a case where the video synthesis system 420 determines to focus on lip synchronization with the dubbed audio 511 (but otherwise retaining the same face shape and/or pose of the source person), the identified region may include one or more regions (e.g., locations) of the face associated with synchronization of the lips to the dubbed audio (e.g., the lips, a portion of the cheeks, the brows, etc.). In some embodiments, the identified regions may be associated with a variability of expression (e.g., a difference of expression) between the first 3D model of the face and the second 3D model of the face. In some embodiments, this identified region may correspond to the entire face (e.g., and/or head) of the particular person, for example, in a case where the video synthesis system 420 determines to replace the face pose, expression, and shape parameters for the particular person (e.g., replacing a source person's face with a target person's face). It should be understood that the identified region may correspond to any suitable region (or regions) of the face.

Also, the identified region may be defined by the video synthesis system 420 according to any suitable method. For example, the region (or regions) may be predefined according to a set of vertices (e.g., of a polygon) that encapsulate a particular part of the face (e.g., the lips) that is determined to be replaced. In some embodiments, the region may be determined during run-time. For example, the video synthesis system 420 may execute a machine learning algorithm (e.g., a neural network) to perform deep learning to determine a mask for the face, which may correspond to a "heat map" of expressions. This heat map may indicate regions of the face where there is an increased amount of movement of the face (e.g., an increased variability of expression) in the video shot 503, for example, when the person is speaking. This may include, for example, the lips (e.g., and/or portions of the lips), the cheeks, the eyebrows, etc. In some embodiments, the video synthesis system 420 may identify a corresponding one or more regions of the face in the first 3D model, which may be associated with features of the neural texture.

In some embodiments, the deferred neural renderer 519 may then render the identified region of the second 3D model based at least in part on the neural texture 505. For example, suppose that the identified region includes the lips of the second 3D model. In this example, the deferred neural renderer 519 may utilize the neural texture 505 to determine how to render the lips. For example, the neural texture 505 may indicate a particular color (e.g., and/or a set of pixel variations) that should copied to the region corresponding to the new lips of the second 3D model. In another example, the neural texture 505 may be utilized to indicate a particular lighting that should be applied when rendering color to the region of the second 3D model. It should be understood that the rendering of pixels may be performed in a parameterized fashion based at least in part on the 3D model itself being a parameterized model. In some embodiments, as described further herein (e.g., with respect to FIG. 6), because the neural texture 505 may holistically capture slight variations (e.g., of colors, lighting, etc.) between different frames of a shot, thus creating a new high dimensional texture of the shot, the video synthesis system 420 may be able to render one or more novel pixels for the rendered region of the particular frame (e.g., frame 523). For example, suppose that the second 3D model shows the mouth of the person being open, such that the teeth are exposed, whereas the original frame 523 did not show the teeth of the person. However, in this example, another frame of the particular shot 503 did show the teeth exposed, whereby the neural texture 505 may have incorporated information (e.g., color and/or structure data) associated with the teeth. Accordingly, the deferred neural renderer 519 may utilize texture data from the neural texture 505 to effectively render novel pixels (e.g., associated with the teeth) for the second 3D model, such that the teeth are correctly fitted into the open mouth. Accordingly, by performing deferred neural rendering utilizing a neural texture that holistically capture information from neighboring frames of the respective video shot, embodiments may more efficiently and accurately enable automatic video synthesis (e.g., lip synchronization and/or replacement of persons), for example, by efficiently rendering novel pixels that enable a photorealistic presentation.

In some embodiments, as part of the deferred neural rendering pipeline, the video synthesis system 420 may further blend the rendered region of the second 3D model with the frame 523. For example, the deferred neural renderer 519 may identify a background that corresponds to a portion of the original frame 523. The deferred neural renderer 519 may then blend the rendered region with the background. In some embodiments, the blending may utilize any suitable techniques, for example, utilizing a Laplacian smoothing technique. In some embodiments, the blending may further utilize the neural texture 505. In some embodiments, the blending may be performed to eliminate jitter and/or artifacts from the frame. Upon completing the blending of the rendered region with the frame 523 (e.g., a "first frame"), the video synthesis system 420 may output the new frame 521 (e.g., a "second frame") that replaces the first frame of the particular shot. Using an earlier example, the second frame may show the face of the particular person speaking the message in the different way (e.g., the second language (e.g., Hindi) instead of the first language (e.g., English)).

As described above, the process 500 describes outputting a second (e.g., new) frame to replace a first (e.g., original) frame, whereby the second frame shows the face (e.g., including the lips) of a person synchronized with a dubbed audio. It should be understood that the process 500 may be repeated for each frame of a particular shot (e.g., utilizing the same (or similar) neural texture for the particular shot), whereby each of the frames of the shot are synthesized to be in sync with the dubbed audio. Similarly, other video shots of an associated video file may be updated, thus, enabling an entire video file to be updated. Also, the process 500 described a process for updating the face of a single person. It should be understood that the faces of multiple persons within a frame (and/or shot) may be updated, according to embodiments herein. For example, in one embodiments, the video synthesis system 420 may iterate the process 500 for each face that should be updated. In another example, the video synthesis system 420 may perform video synthesis over each face (and/or body) in parallel, across all identified source persons in the given frame to be replaced by target persons.

Although the process 500 focuses primarily on performing video synthesis to synchronize a face expression of a face with a dubbed audio, it should be understood that the techniques described may also be applicable to performing video synthesis to replace both a face and body (or any suitable combination of features thereof) of a source person with a target person. For example, as described further herein (e.g., with respect to FIG. 7), a neural texture may be generated for a shot. Also, a 3D model may be generated for both the face and body of a particular target. The 3D model may be updated to incorporate (e.g., merge) model parameters based on one or more inputs (e.g., expression parameters from a dubbed audio, face pose and body pose parameters from a 3D model of a source person). Then, the video synthesis system may perform deferred neural rendering of the modified 3D model and blend the rendered model into the frame, and then subsequently output a new frame.

Figure 6:
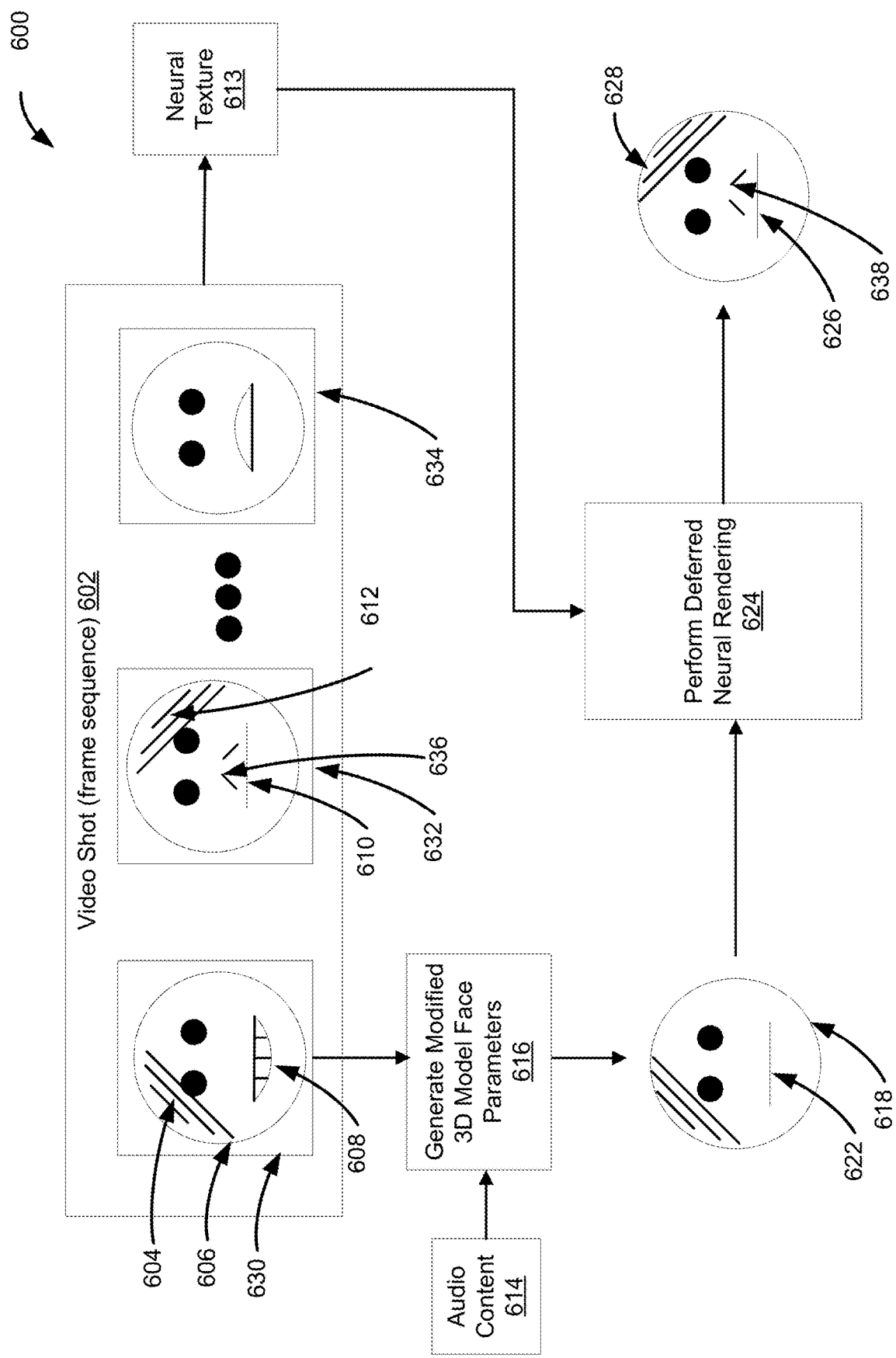
FIG. 6 illustrates another example technique for generating a new video frame of a video that is synthesized with new audiovisual content, in accordance with various embodiments

FIG. 6 illustrates another example technique for generating a new video frame of a video that is synthesized with new audiovisual content, in accordance with various embodiments. Diagram 600 of FIG. 6 illustrates an example process in which a neural texture is learned based on one or more of a sequence of frames of a video shot of a video file. The neural texture is then utilized by a video synthesis system to perform deferred neural rendering of a region (e.g., a mask) of a 3D model of a face shown in a particular frame of the video shot. In the illustration of diagram 600, the video synthesis system may generate one or more novel pixels when performing the deferred neural rendering based in part on the learned neural texture.

Turning to the process illustrated by diagram 600 in further detail, a video synthesis system (e.g., which may be similar to any video synthesis system described herein) may receive a video shot 602 as input. In diagram 600, the video shot 602 includes a sequence of frames, which may correspond to pre-modified (e.g., original) frames of the video file. The sequence of frames may include, for example, a first frame 630, a second frame 632 that follows the first frame 630, and a third frame 634 that follows the second frame 632, etc. It should be understood that these are representative frames of the sequence of frames, and may be continuous to each other or may be separated by any suitable number of frames.

In some embodiments, the process may proceed with the video synthesis system generating (e.g., learning) a neural texture 613 of the video shot 602 based on one or more of the sequence of frames. In some embodiments, this may be similar to as described with respect to operations of block 502 of FIG. 5. As described herein, the neural texture 613 may be learned at any suitable time, for example, in parallel to the video synthesis system generating one or more 3D models of a face shown in a particular frame of the video shot 602.

Turning to the neural texture 613 in further detail, the neural texture 613 may correspond to a multi-dimensional texture (e.g., captured within a multi-dimensional vector, or other suitable data structure) that captures details from multiple frames of the video shot 602. For example, as depicted in video shot 602, the first frame 630 shows at least a particular face 606 of a person. The first frame 630 shows the teeth 608 of the particular face 606, as the person may be smiling, or otherwise showing their teeth while speaking. The first frame 630 also shows a first lighting 604, for example, whereby the first lighting 604 highlights the upper right (e.g., from the person's perspective) of the particular face 606 shown in the first frame 606. For example, the first frame 630 may have been captured whereby the upper right of the particular face 606 is facing (e.g., reflecting) the sun. It should be understood the teeth 608 and the first lighting 604 are representative examples of different potential characteristics of the particular face 606 captured in the first frame 630. Other non-limiting characteristics may include a mark (e.g., a birthmark) on the particular face 606, a freckle, a wrinkle, etc. Each of these characteristics may also correspond to one or more colors and/or structural data, whereby a particular region (e.g., the teeth 608) may itself have multiple color and/or structural variations (e.g., white, off-white, yellow, etc.). A machine learning model of the video synthesis system may learn each of these characteristics for the first frame 630 (e.g., via deep learning), as referenced herein. It should be understood that any suitable characteristics (e.g., color data and/or structural data) may be learned by the video synthesis system.

Similarly, the second frame 632 may also show, among other things, the same face of the person as in the first frame 630. In this case, the face shows the mouth being closed, with the lips 610 being pursed together. Note that above the lips 610, a micro-expression 636 corresponding to upper-lip skin folds also appear in the second frame 632. Additionally, a second lighting 612 on the face may be on the opposite side of the face (e.g., the upper left, from the person's perspective). Also, the third frame 634 may show the same face, except with the face frowning. For each of these frames, the video synthesis system may learn a texture of the face, for example, similar to as described with respect to the first frame 630. For example, the video synthesis system may learn textures for the face when the mouth is closed or frowning. Accordingly, the video synthesis system may capture different variations of colors and/or structural data of the face between different frames of the video shot 602. These variations may be included within a multi-dimensional neural texture (e.g., the neural texture 613) that captures the essence of the video shot 602.

It should be understood that the neural texture 613 may be generated by any suitable combination of one or more frames of the video shot 602. For example, in some embodiments, a subset of the frames of the video shot may be used to generate the neural texture 613 that is subsequently used to perform deferred neural rendering associated with a particular frame. The subset of frames may correspond to frames that neighbor the particular frame (e.g., a predefined number of frames that appear before and/or after the particular frame). In some embodiments, this subset of frames may enable the video synthesis system to adequately capture the essence (e.g., a holistic texture) of the shot, such that deferred neural rendering can accurately produce a photorealistic 3D model that can be blended with the particular frame. In some embodiments, a larger set (e.g., all) of the frames of the video shot may be utilized to generate the neural texture 613.

As described herein, the learned neural texture 613 may subsequently be utilized by the video synthesis system to perform deferred neural rendering of a region (e.g., a mask) of a 3D model of a face shown in a particular frame of the video shot. For example, suppose that the video synthesis system determines to automatically perform synchronization of the face of the particular person to a particular audio content 614 (e.g., a dubbed audio file) within the video shot 602. As described herein, this may include receiving as input a particular frame of the video shot 602 (e.g., the first frame 630). The video synthesis system may then determine parameters (e.g., face pose, shape, and/or expression parameters) for a 3D model (e.g., a 3DMM) of the face of the particular person. The video synthesis system may also determine facial parameters based on the audio content 614 (e.g., face expression parameters). These parameters may be merged to generate parameters 616 for a modified 3D model 618, as depicted in FIG. 6. In some embodiments, this may be similar to as described in reference to block 504 of FIG. 5.

In the example of modified 3D model 618, the lips 622 of the person may be pursed together (e.g., mouth closed), similar to the second frame 632 of the video shot 602. In one example, the facial expression for a word being voiced via the dubbed audio content 614 may correspond to the closed mouth at a point in time that is synchronized between the first frame 630 and the audio content 614. It should be understood that any suitable facial parameters (e.g., and/or associated facial characteristics) may be updated according to the dubbed audio content 614.

The process may proceed whereby the deferred neural renderer 624 of the video synthesis system performs deferred neural rendering of an identified region associated with the modified 3D model 618. In some embodiments, the deferred neural renderer 624 may perform similar operations to as described herein, for example, with respect to block 506 of FIG. 5. For example, the video synthesis system may identify the lips 622 as being a region that will be rendered, for example, by adding color to the model so that the identified region is colored/textured with a photorealistic texture. The video synthesis system may then render the lips 622 to produce photorealistic lips 626 that is accurately colored, based at least in part on the neural texture 613. For example, the video synthesis system may utilize color data and/or structural data from the neural texture 613 to determine how to render the lips 626.

As described herein, the lips may be one portion of a region of the face that is determined to be rendered, for example, based on identifying a mask of the face. In some embodiments, the mask correspond to a "heat map" of expressions of the face within the video shot 602, whereby the heat map indicates a region where there is an increased variability of expression of the face (e.g., movements of the lips, micro-expressions involving movement of the cheeks or brows, etc.) in the video shot 602. In some embodiments, the region may be determined based on determining a difference between first facial parameters determined from the audio content 614 and second facial parameters determined from the first frame 630. In some embodiments, this difference between parameters may also be associated with variability of expression(s) of the face in the video shot 602.

In some embodiments, the video synthesis system may determine to render one or more novel pixels based in part on the neural texture 613. In some embodiments, a novel pixel may be associated with a characteristic of a face (e.g., or body, as described further in reference to FIG. 7) that is also shown in a neighboring frame, whereby the characteristic is not originally shown in the original current frame (e.g., the first frame 630). This characteristic may be learned by and/or stored within the neural texture 613, whereby the neural texture 613 may be used to render the novel pixel corresponding to the characteristic in a photorealistic way. In some embodiments, this method of rendering (e.g., including rendering novel pixels) may enable a more efficient end-to-end pipeline for synthesizing video content, for example, mitigating a need to manually render pixels from frame-to-frame.

In a first example of rendering novel pixels, and, utilizing diagram 600 for illustration, suppose that the video synthesis system determines that the region surrounding the lips 622 (e.g., including the upper-lip region above the lips 622) should be part of the mask that is rendered for the modified 3D model 618. In this example, although the first frame 630 may not have captured the micro-expression 636 associated with the upper-lip region, the second frame 632 may capture color data and/or structural data associated with this micro-expression within the neural texture 613. Accordingly, the video synthesis system may utilize the neural texture 613 when rendering this surrounding region to render one or more novel pixels associated with a micro-expression 638 that is similar to the micro-expression 636 in the second frame 632. In another example, the video synthesis system may further utilize the neural texture 613 to render lighting 628 (e.g., a lighting texture on the upper left of the face), which may be similar to the second lighting 612 of the second frame 632. In this example, the video synthesis system may further render one or more other micro-expressions to remove lighting from the upper right of the face. This also may involve rendering one or more novel pixels, which may not have been present in the first frame 630.

Upon rendering the one or more mask regions of the modified 3D model (e.g., including the lips 626, the micro-expression 638 at the upper-lip region, and the lighting 628 for the upper left region), the video synthesis system may then blend the rendered regions within the first frame 630 (e.g., within a background of the first frame 630) to generate a new (e.g., modified) frame.

Although the illustration of diagram 600 focuses primarily on performing video synthesis with respect to facial expressions of a face (e.g., for performing lip synchronization to a dubbed audio content), embodiments should not be construed to be so limiting. For example, each of the sequence of frames of the video shot 602 may show both a face portion and body portion of a source person. For example, the source person may be walking and speaking in the foreground. In this example, the neural texture 613 may include color data and structural data corresponding to both the face portions and body portions for each frame. For example, if the source person had a mark (e.g., a scar) on their leg that was visible in the frames, texture information associated with the scar may be captured by the neural texture 613. Suppose further that the source person is to be replaced within the video shot 602 by a target person and/or the face of the target person is to be further synchronized to the dubbed audio 614. In this case, the deferred neural rendering 624 may also be utilized to render pixels (e.g., including novel pixels) based on the neural texture 613. For example, texture data (e.g., color data) associated with the leg of the source person may be used to render a photorealistic leg of the target person. In some embodiments, this may also include rendering unique marks (e.g., the scar on the source person's leg) onto the leg of the target person. It should be understood that, in a case where both the face portion and the body portion of the source person may be replaced by the target person (e.g., updating the face shape, face expression parameters, and the body shape parameters), the masked region which may be rendered by the deferred neural renderer may be larger than in a case where only specific regions of the face may be rendered (and then, subsequently blended). For example, substantially all of the face portion and/or body portion may be rendered.

Figure 7:
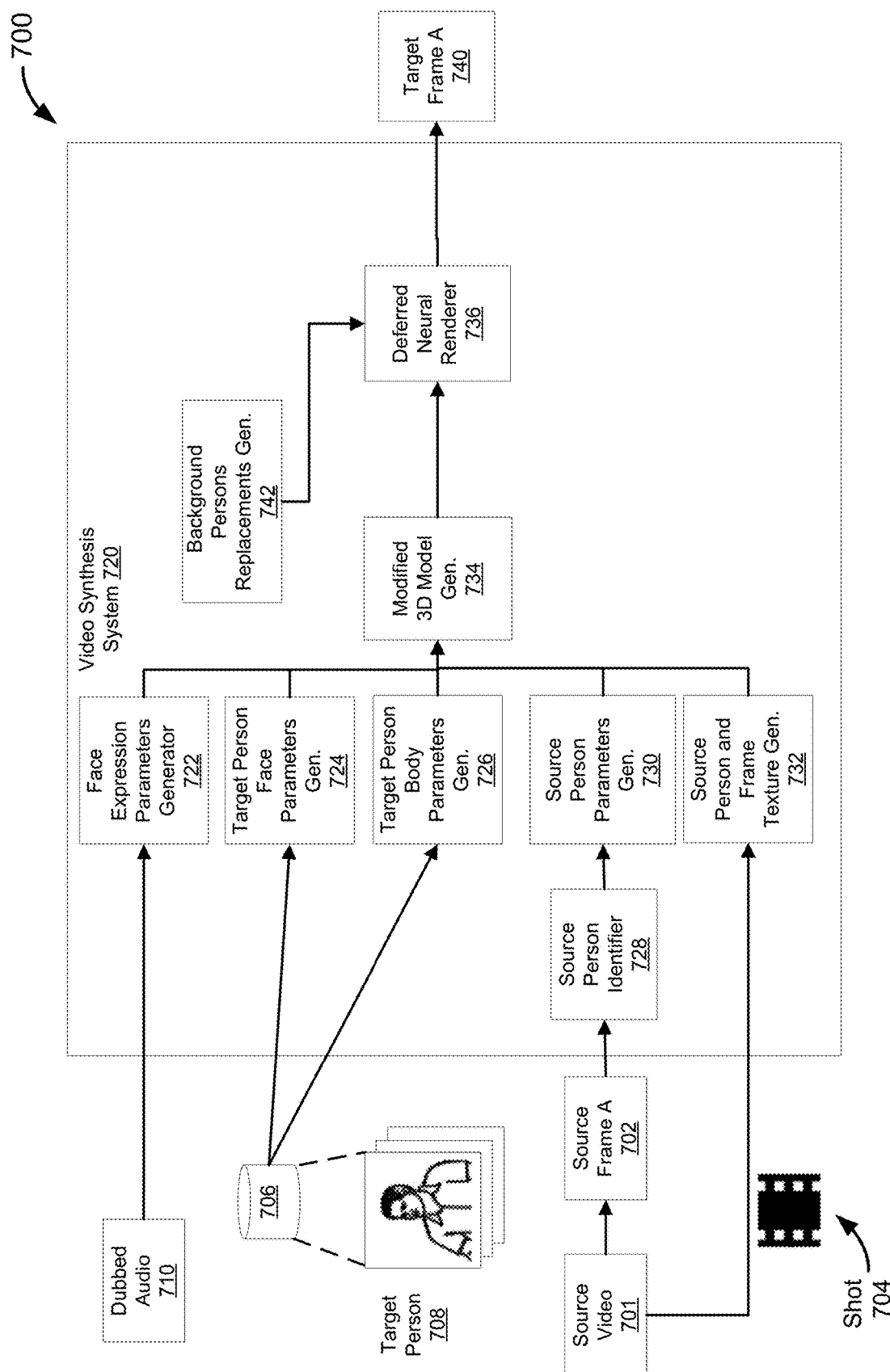
FIG. 7 illustrates another example architecture for generating a new video frame of a video that is synthesized with new audiovisual content, in accordance with various embodiments.

FIG. 7 illustrates another example architecture for generating a new video frame of a video that is synthesized with new audiovisual content, in accordance with various embodiments. In diagram 700 of FIG. 7 a video synthesis system 720 is depicted, which may be similar to any video synthesis system described herein. In this example, the video synthesis system 720 receives as input a dubbed audio 710 (with optional associated subtitles), one or more images of a target person 708 (e.g., which may be retrieved from a repository 706), a source frame A 702, and a source shot 704. The source frame A may be one of a sequence of frames of the source shot 704, as described herein. Likewise, the source shot 704 may be one of a sequence of shots of a source video 701. In this example, the video synthesis system 720 may utilize the different inputs to replace a source person shown within the source frame A 702 with the target person 708, thus outputting a new target frame A 740.

As depicted by diagram 700, the video synthesis system 720 may include one or more modules (e.g., components) for implementing the features disclosed herein, including a source person identifier module 728, a face expression parameters generator module 722, a target person face parameters generator module 724, a target person body parameters generator module 726, a source person parameters generator module 730, a source person and frame texture generator module 732, a modified 3D model generator module 734, a background persons replacements generator module 742, and a deferred neural renderer 736.

Each of these modules may executed within a pipeline for generating the target frame A 740 based in part on the inputs described above. It should be understood that any one or more operations performed by a particular module may also (and/or alternatively) be performed by another one or more modules described herein. In some embodiments, one or more of the modules described in reference to FIG. 7 may perform similar operations to as described in reference to FIG. 4 (and/or FIGS. 5 and 6), which is primarily directed to performing video synthesis by synchronizing the lips of a given person with a dubbed audio. In the case of FIG. 7, an additional feature of replacing the face portion (e.g., including the face shape) and/or body portion (e.g., including the body shape) of the source person with target person may also be performed.

To further illustrate the operations of each of the modules, consider a scenario in which the video synthesis system 720 receives the dubbed audio file 710. The face expression parameters generator 722 may then determine facial parameters based on the dubbed audio 710, for example, similarly to as described in reference to the face expression parameter generator module 426 of FIG. 4. In some embodiments, optional subtitles may also be used to generate the facial parameters, as described herein. In some embodiments, the facial parameters may include face expression parameters. In some embodiments, the facial parameters may also include face pose and/or face shape parameters, for example, which may be associated with face expression parameters (e.g., a position of the jaw while speaking). It should be understood that, although the illustration of diagram 700 involves the video synthesis system 720 also performing lip synchronization (e.g., of the target person's lips) to the dubbed audio 710, embodiments should not be construed to be so limited. For example, in one embodiment, the target person's lips may be synchronized with the original audio. In this case, the parameters for the face expressions of the target actor may be similar to (e.g., the same as) parameters for the source actor's face expressions.

As described herein, the video synthesis system 720 may further receive one or more images of the target person 708. The target person face parameters generator 724 may analyze the collective images, and then generate first facial parameters of the target face portion of the target person. The first facial parameters may include at least one of face shape, face pose, or face expression parameters. In some embodiments, the operations of this module may be similar to as described herein (e.g., in reference to FIGS. 2 and/or 4).

Similarly, the target person body parameters generator 726 may analyze the images and generate first body parameters of the target person, including at least one of body shape or body pose parameters. In some embodiments, the operations of this module may be similar to as described herein (e.g., in reference to FIG. 3). In some embodiments, the first body parameters and first facial parameters may, together, be included as first parameters of the target person, whereby the first parameters correspond to a parametric model (e.g., a 3DMM) of the target person (e.g., including body and face). It should be understood that a set of sample images may exist for each potential target person (e.g., stored in the repository 706), whereby a different 3DMM may be generated (e.g., in advance) for each candidate target person.

In some embodiments, the video synthesis system 720 may also receive the source frame A 702, and identify and/or localize the source person within the source frame A 702 via the source person identifier 728. For example, the source person identifier 728 may execute any suitable face recognition algorithm and determine an identity of the source person. As described further herein, the source person identifier 728 may also determine that the target person (e.g., corresponding to the one or more sample images of the target person 708) is a replacement for the source person based on the determined identity. For example, the video synthesis system 720 may include a predetermined map indicating a replacement of each source person (e.g., source actor) with a target person (e.g., a regional replacement actor). Based on this mapping, the video synthesis system 720 may proceed forward with replacing the source person with the target person in the frame.

The source person parameters generator module 730 may then generate second parameters for the source person in the source frame A 702. For example, the second parameters may include second body parameters (e.g., body shape and/or body pose parameters) and second face parameters (e.g., face shape, pose, and/or expression parameters) of the source person. In some embodiments, these operations may be performed similarly to as described with respect to FIGS. 2 & 3.

The source person and frame texture generator module 732 may be responsible for generating a neural texture of the shot 704. In some embodiments, the neural texture may include color data and/or structural data associated with the source person. In some embodiments, the neural texture may also include color data and/or structural data associated with the frame (e.g., and/or neighboring frames of the source frame A 702). As described herein, the neural texture may be associated with a texture space that holistically captures the shot 704, thus incorporating features from a plurality of frames of the shot 704.

The modified 3D model generator module 734 may be responsible for determining third parameters of a 3D model of the target person. This module may determine the third parameters based on merging the one or more of the first parameters of the target person with one or more of the second parameters of the source person. For example, the third parameters may include face pose parameters of the source person and face shape parameters of the target person. The third parameters may also include body pose parameters of the source person and body shape parameters of the target person. In some embodiments, the face expression parameters may be derived from the dubbed audio 710, as described above. By merging the parameters in this way, the video synthesis system 720 may effectively retain the face and body pose of the source person, thus maintaining a similar (e.g., same) narrative portrayed by the video shot. At the same time, the video synthesis system 720 may effectively replace the identity of the source actor with the target actor by replacing at least the face shape and body shape parameters. It should be understood that any suitable combination of parameters may be selected, depending on the intended output. As described herein (e.g., with respect to FIGS. 2 & 3) in some embodiments, one or more techniques may be used to ensure temporal cohesion between the source frame A 702 and other frames of the shot 704, including, for example, optical flow and/or utilizing Kalman filters to estimate future state (e.g., a future pose) based on historical data.

Upon generating the third parameters for the 3D model of the target person, the deferred neural renderer 736 may render the 3D model of the target person based on the neural texture previously generated by module 732. In some embodiments, the deferred neural renderer 736 may perform operations similar to those as described in reference to block 506 of FIG. 5 and/or diagram 600 of FIG. 6. For example, the deferred neural renderer 736 may render both the face portion and the body portion of the 3D model of the target person, whereby the rendering may include generating a photorealistic image of the target person.

As described herein, in some embodiments, one or more other persons may be shown in the source frame A for which there is no candidate target real-world person. For example, a movie frame may show a lead actor in the foreground who is speaking to an audience in the background. In this example, the individuals in the audience may not have a corresponding real-world (e.g., well-known) replacement actor (e.g., sample images, etc.) for which to generate a parametric 3DMM model. However, the video synthesis system 720 may still determine to generate regional replacement persons (e.g., actors) for the audience in the background. In this case, the background persons replacement generator module 742 may be responsible for generating 3D models (e.g., 3DMM) for the background persons (e.g., utilizing similar techniques to as described herein), and then utilizing a Generative Adversarial Network (GAN) to replace the original background persons with the replacement persons.

Continuing with above, upon rendering the 3D model of the target person, the source person may be replaced by the target person within the source Frame A 702. In some embodiments, the video synthesis system 720 may perform one or more techniques to blend the target (e.g., replacement) person into the frame. For example, in some embodiments, upon rendering the target person and then replacing the source person in the source frame A 702 with the target person, the deferred neural renderer 736 may also render (e.g., re-render) the source frame A 702 utilizing the learned neural texture for the shot 704. The video synthesis system 720 may then output the target frame A 740. In this example, the resulting target frame A 740 may now show the target person (e.g., the regional replacement actor), who may also (optionally) have their facial expressions synchronized to the dubbed audio 710.

In the example described above, a single target person was described as replacing a source person. However, it should be understood that this technique may also be applicable to replacing multiple source persons within the same frame (and/or shot or video) with respective target persons. For example, a new 3DMM may be generated for each target person, similar to as described above. Then, the video synthesis system 720 may perform deferred neural rendering of the 3D model for each target person, replace the corresponding source person in the frame, and then re-render the frame (e.g., utilizing the neural texture for the shot 704). Similarly, this technique may be applied for each frame in a given shot, and, likewise, for each shot in a movie. In this way, techniques enable an automated process for generating a target video from a source video, whereby the target video offers both a native language experience (e.g., including face synchronization with a dubbed audio) and as well as having the original actors in the original movie replaced with regional actors.

Figure 8:
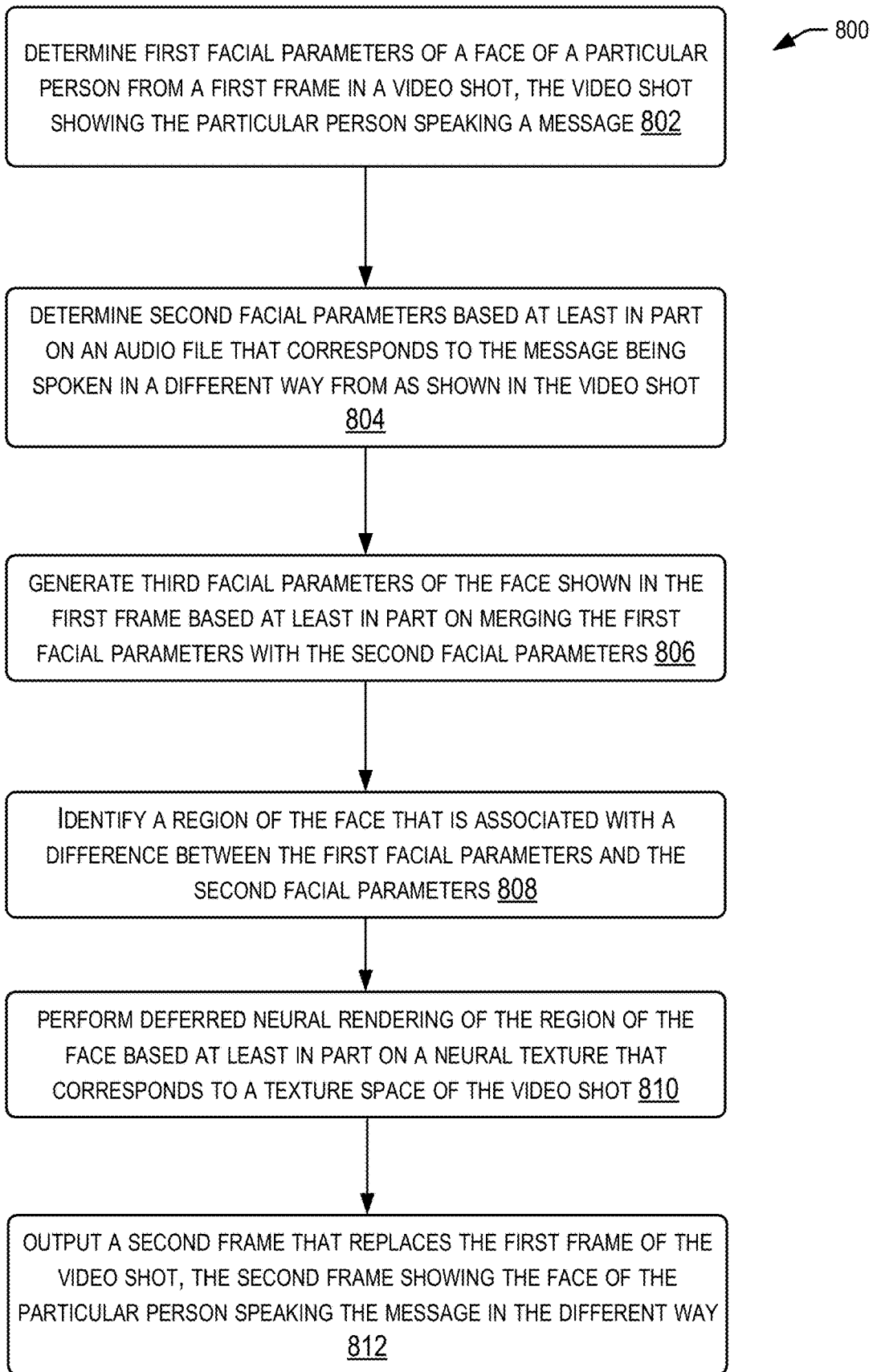
FIG. 8 illustrates an example flow for generating a new video frame of a video that is synthesized with new audiovisual content, in accordance with various embodiments.

FIG. 8 illustrates an example process 800 for generating a new video frame of a video that is synthesized with new audiovisual content, in accordance with various embodiments. In process 800, a video synthesis system (e.g., which may be similar to any video synthesis system described herein) automatically synchronizes at least the facial expressions of a particular person (e.g., including the lips, cheek movements, brow movements, and/or micro-expressions of the face) with audio content (e.g., dubbed audio) of an audio file.

Some or all of the process 800 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At block 802, a video synthesis system determines first facial parameters of a face of a particular person from a first frame in a video shot, the video shot showing the particular person speaking a message. For example, the video synthesis system may receive a video file that includes a sequence of shots (e.g., video shots). The video shot may be a particular shot of the sequence of shots, whereby the video shot includes a sequence of frames that includes the first frame. The first frame may be showing at least a portion of the face of the particular person, for example, including the lips of the face. In some embodiments, the video shot may show the particular person speaking the message in a first language (e.g., English). In some embodiments, the video shot may show the particular person speaking (e.g., voicing) words and/or sounds in any a particular way (e.g., with a particular intonation, pitch, tone, timbre, accent, etc.). In some embodiments, the video synthesis system may first identify and/or localize the face of the particular person within the first frame, as described herein. Upon identifying and/or localizing the face, the video synthesis system may determine the first facial parameters for the particular person, which may correspond to (e.g., and/or be used to present) a three-dimensional model (e.g., a 3DMM) of the face of the particular person. In some embodiments, the first facial parameters may include face expression parameters, face pose parameters, and/or face shape parameters, for example, as described in reference to FIG. 2. In some embodiments, the video file may include any suitable video content, including, but not limited to, a movie, a recording from a mobile phone, a television show, etc.

At block 804, the video synthesis system determines second facial parameters based at least in part on an audio file that corresponds to the message being spoken in a different way from as shown in the video shot. In some embodiments, the audio file may correspond to a dubbed audio content that is a supplemental audio recording for the original video file. For example, in a case where the original video file may correspond to a movie, whereby the original voice dialogue between actors/actresses is in the first language (e.g., English), the dubbed audio for each actor may be recorded in a second language (e.g., Hindi). In some embodiments, the message recorded in the audio file (e.g., which may be any suitable word content and/or sounds being voiced) may be voiced in any suitable different way. For example, the different way may correspond to a difference in intonation, pitch, tone, timbre, etc. In some embodiments, the different way may correspond to a different voice (e.g., of a voice-over person) that voices the same words. In some embodiments, the second facial parameters may include any suitable parameters, including face pose, expression, or shape parameters, which may be determined from the audio file. In some embodiments, the determination of the second facial parameters associated with the audio file may be performed similarly to as described in reference to FIG. 2. For example, the second facial parameters may include second expression parameters associated with the lips of the voice that voiced the audio content (e.g., in the second language).

It should be understood that the message spoken in the original video shot may be independent of the message spoken in the different way in the audio file (e.g., the dubbed audio). For example, a first length of the audio track of the dubbed audio may be different from a second length of the audio in the original video shot. In some embodiments, a difference between the first length and the second length may be within a predefined threshold. Also, in some embodiments, audio elements of the audio in the original video shot (e.g., tone, timbre, etc.) may be independent (e.g., different) from audio elements in the dubbed audio. Similarly, the facial parameters (e.g., including facial expressions, face shape, etc.) of the face that spoke the original audio may be different from the facial parameters determined from the dubbed audio. By enabling the dubbed audio to be generated independently from the original audio (e.g., within some time bounding constraints), techniques enable a more efficient process for automatically performing video synchronization to a dubbed audio. For example, the dubbed audio may be generated faster, while still being accurately integrated into the video shot.

At block 806, the video synthesis system generates third facial parameters of the face shown in the first frame based at least in part on merging the first facial parameters with the second facial parameters. In some embodiments, the third facial parameters may be used to express a second three-dimensional model of the face. For example, the video synthesis system may merge the parameters by replacing at least one of the expression parameters of the first facial parameters with at least one of the second expression parameters of the second facial parameters. In some embodiments, the third facial parameters may incorporate other parameters from the second facial parameters, for example, which may be associated with the second expression parameters. For example, a jaw pose parameter may be associated with one or more expression parameters of the lips or cheeks. The video synthesis system may utilize any suitable procedure to determine how to merge parameters, for example, based on the intended output frame (e.g., to satisfy customer demand).

At block 808, the video synthesis system identifies a region of the face that is associated with a difference between the first facial parameters and the second facial parameters. In some embodiments, the region may include at least the lips of the face, to be used for automatic lip synchronization. In some embodiments, region may include other areas of the face have some variability of expression (e.g., movement) while the particular person is speaking (e.g., the cheeks, brows, jaw, etc.) within the particular shot. In some embodiments, the region may be dynamically determined based in part on a machine learning algorithm that identifies a map of the face that indicates areas of the face where the face expression (and/or pose, shape) changes while the face is speaking. In some embodiments, the region may be predefined, for example, to specific areas of the face that are determined to be updated (e.g., the lips region, the upper cheeks region, the brows region, etc.). In some embodiments, the region may correspond to any suitable portion (e.g., all) of the face as expressed by the 3D model.

At block 810, the video synthesis system performs deferred neural rendering of the region of the face based at least in part on a neural texture that is associated with the sequence of frames of the particular shot. In some embodiments, the neural texture corresponds to a texture space of the video shot. In some embodiments, the operations of this block may be similar to as described, for example, in reference to FIGS. 5 and 6. For example, at any suitable time prior to this block 810, the video synthesis system may determine (e.g., learn) a neural texture that holistically captures color data and/or structural data of one or more of the sequence of frames of the shot (e.g., frames that neighbor the first frame). In some embodiments, the neural texture may be learned via machine learning model, as referenced herein. In some embodiments the deferred neural rendering may utilize the neural texture to render the region to create a photorealistic expression of the region of the face. In some embodiments, performing the deferred neural rendering may include rendering at least one novel pixel for the rendered region based at least in part on the neural texture. The novel pixel may be associated with a first characteristic of the face that is also shown in a neighboring frame within the particular shot, whereby the first characteristic is not originally shown in the first frame (e.g., as described in reference to FIG. 6). In some embodiments, as part of the deferred neural rendering process, the video synthesis system may blend the rendered region of the second 3D model of the face with the first frame (e.g., with a background of the first frame). In some embodiments, the blending process may also utilize the previously learned neural texture. In some embodiments, the blending may utilize any suitable blending technique (e.g., Lapacian smoothing).

At block 812, the video synthesis system outputs a second frame that replaces the first frame of the video shot, the second frame showing the face of the particular person speaking the message in the different way. For example, in the case where the first frame shows the particular person speaking the message in the first language (e.g., with a particular facial expression), the second frame may show the person speaking the message in the second language (e.g., with another facial expression). It should be understood that the second frame may be synchronized to the audio content of the audio file. The video synthesis system may perform a similar procedure for each frame of the video shot, and, likewise, for the sequence of video shots of the video file. In this way, the video synthesis system may automatically synchronize the lips (and/or other facial features) of the particular person with the audio file throughout the video presentation. It should be understood that a similar procedure may be performed for other faces that may appear in the particular shot (and/or video file). For example, a different 3D model may be generated for another actor's face shown in the first frame, whereby the model is generated based in part on another dubbed audio file. Then, the video synthesis system may perform deferred neural rendering on a region of the different 3D model, and then subsequently output the second frame that shows both the particular person and the other actor's face, whereby the facial characteristics (e.g., expressions) of both actors are synchronized to respective dubbed audio files.

Figure 9:
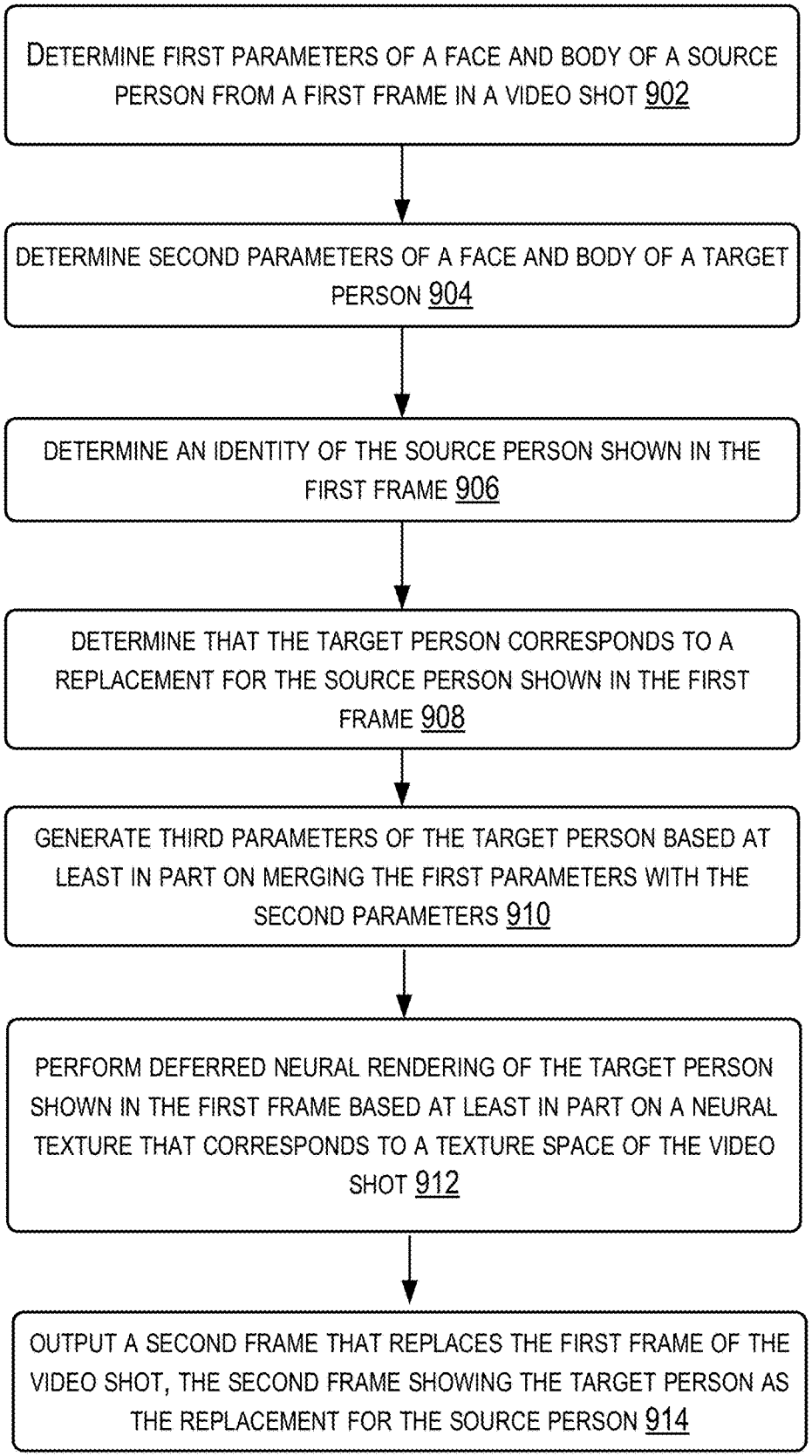
FIG. 9 illustrates another example flow for generating a new video frame of a video that is synthesized with new audiovisual content, in accordance with various embodiments.

FIG. 9 illustrates an example flow for generating a new video frame of a video that is synthesized with new audio-visual content, in accordance with various embodiments. In process 900, a video synthesis system (e.g., which may be similar to any video synthesis system described herein) automatically replaces a source person (e.g., including a face portion and/or a body portion of the source person) with a target person. In process 900, the facial expressions (e.g., lip movements, etc.) of the target person may also be optionally synchronized to an audio file (e.g., a dubbed audio), utilizing a similar procedure as described in reference to FIG. 8.

At block 902, a video synthesis system determines first parameters of a face and body of a source person from a first frame in a video shot. For example, the video synthesis system may receive a video file that includes a sequence of shots, whereby the video shot is a particular shot of the sequence of shots. The video shot may include a sequence of frames, whereby the first frame shows a source face portion and a source body portion of the source person. In one example, the source person corresponds to a source actor in an original movie who is to be replace by a target person (e.g., a regional replacement actor). In some embodiments, the video synthesis system may first identify and/or localize the source person within the first frame. In some embodiments, the first parameters may be associated with a 3D model (e.g., a 3DMM) of the source person shown in the first frame. The first parameters may include first facial parameters of the source face portion and first body parameters of the source body portion. The first facial parameters may include face shape, face pose, and/or face expression parameters. The first body parameters may include body shape and/or body pose parameters. In some embodiments, one or more operations of block 902 may be similar to as described in reference to FIGS. 2 and/or 3.

At block 904, the video synthesis system determines second parameters of a face and body of a target person. For example, the video synthesis system may receive (e.g., from a repository, such as a database) a corpus of sample images and/or videos showing the target person. In some embodiments, the second parameters may include second facial parameters of a target face portion (e.g., face pose, shape, and/or expression parameters) and second body parameters (e.g., body pose and/or shape parameters) of a target body portion of the target person. In some embodiments, one or more operations of block 904 may also be similar to as described in reference to FIGS. 2 and/or 3. In some embodiments, the corpus of images compiled for the target person may be such that the face and/or body is captured in a similar way (e.g., a similar pose and/or expression) as the source video. In some embodiments, the lighting and/or other environment conditions associated with the corpus of images may be similar to that of the original video file. In some embodiments, the target person may optionally be selected such that characteristics of the target person (e.g., body shape parameters) are within a predefined differential threshold. For example, a target person may be selected to have a similar body shape as the source person. In some embodiments, the target person may optionally wear similar (or different) clothing as the source person. In some embodiments, a second video shot may be optionally generated prior to block 904, whereby the target person performs similar body movements (e.g., movements of the arms, legs, and/or torso) as the source person in the source video. In some embodiments, the similar body movements may also be within a predefined threshold of difference from the original body movements of the source person. In some embodiments, by generating a corpus of images and/or video shots of the target person that are similar to the body and/or facial movements of the original source person, techniques herein may enable a more accurate synthesis to replace the source person with the target person in the original video shot.

At block 906, the video synthesis system determines an identity of the source person shown in the first frame. For example, the video synthesis system may execute a facial recognition algorithm to identify the source person as a particular source actor. It should be understood that the operations of block 906 (and block 908, described below) may be performed at any suitable time, for example, prior to generating the first parameters of the source person or the second parameters of the target person. It should also be understood that the first frame may include more than one source person that is to be replaced by a respective target person. In some embodiments, this block may be similar to as described in reference to FIG. 7.

At block 908, the video synthesis system determines that the target person corresponds to a replacement for the source person shown in the first frame. For example, the video synthesis system may maintain a mapping between source actors and target actors, the mapping indicating which target actor is a replacement for a respective source actor. Accordingly, the video synthesis system may utilize this mapping and the determined identity from block 906 to determine that the target person is the replacement for the particular source person.

At block 910, the video synthesis system generates third parameters of the target person based at least in part on merging the first parameters with the second parameters. In some embodiments, the third parameters may include third facial parameters and third body parameters of a 3D model (e.g., a 3DMM) of the target person. In some embodiments, the video synthesis system may determine to replace the shape of the face and body of the source person with the target person, while keeping the face expression, face and body poses, and texture of the source actor intact. Accordingly, the video synthesis system may include within the third facial parameters the face pose parameters of the source person and face shape parameters of the target person. In some embodiments, face expression parameters may be also drawn from the first parameters of the source person. In some embodiments, the face expression parameters may optionally be determined from a dubbed audio, as described in reference to FIG. 8. Also, in accordance with the scenario above, the third body parameters may include body pose parameters of the source person and body shape parameters of the target person. It should be understood that any suitable method may be used to determine the third parameters, depending on the intended output frame.

At block 912, the video synthesis system performs deferred neural rendering of the target person shown in the first frame based at least in part on a neural texture that corresponds to a texture space of the video shot. In some embodiments, one or more operations of block 912 may be similar to block 810 of FIG. 8. For example, a neural texture of the shot may be previously learned and capture a texture of the source person and/or the background of the frame. In one example, the deferred neural rendering may be performed over both the face portion and the body portion of the 3D model of the target person. In some embodiments, a particular region of the 3D model may be determined, whereby the determined region is rendered based on the neural texture previously learned. In some embodiments, upon rendering the target person, the video synthesis system may blend the target person with the background of the first frame based in part on the neural texture. In some embodiments, the video synthesis system may render at least one novel pixel associated with the face or body of the target person based at least in part on the neural texture. For example, the video synthesis system may incorporate a physical characteristic of the source person (e.g., a mark on the body) and render the second person as having that characteristic. In some embodiments, the first frame may be re-rendered upon as part of (or separate from) the blending process. In some embodiments, one or more persons shown in the first frame may not be associated with a particular target person. However, the video synthesis system may determine that these people (e.g., background actors, such as an audience in the background of a frame) should also be replaced by regional replacement persons (e.g., not associated with known (e.g., real-world) target persons). The video synthesis system may determine to replace the one or more people, respectively, with a 3D model (e.g., a 3DMM). In this case, a generative adversarial network (GAN) may operate on the respective 3D model(s) to replace the background persons.

At block 914, the video synthesis system outputs a second frame that replaces the first frame of the video shot, the second frame showing the target person as the replacement for the source person. For example, in a case where the original video shot shows the source person walking while talking, the second frame of the video shot may show the target person walking with the same face pose and body pose as the source person. In some embodiments, the target person shown in the second frame may also have a face expression that is synchronized with the dubbed audio. In this way, techniques enable automatic replacement of a person within a particular frame. It should be understood that, similar to as described for block 812, the video synthesis system may perform a similar procedure for each frame of the video shot, and, likewise, for the sequence of video shots of the video file. It should also be understood that a similar procedure may be performed for other persons that may appear in the particular shot (and/or video file), thus replacing a plurality of source persons with respectively associated target persons.

Figure 10:
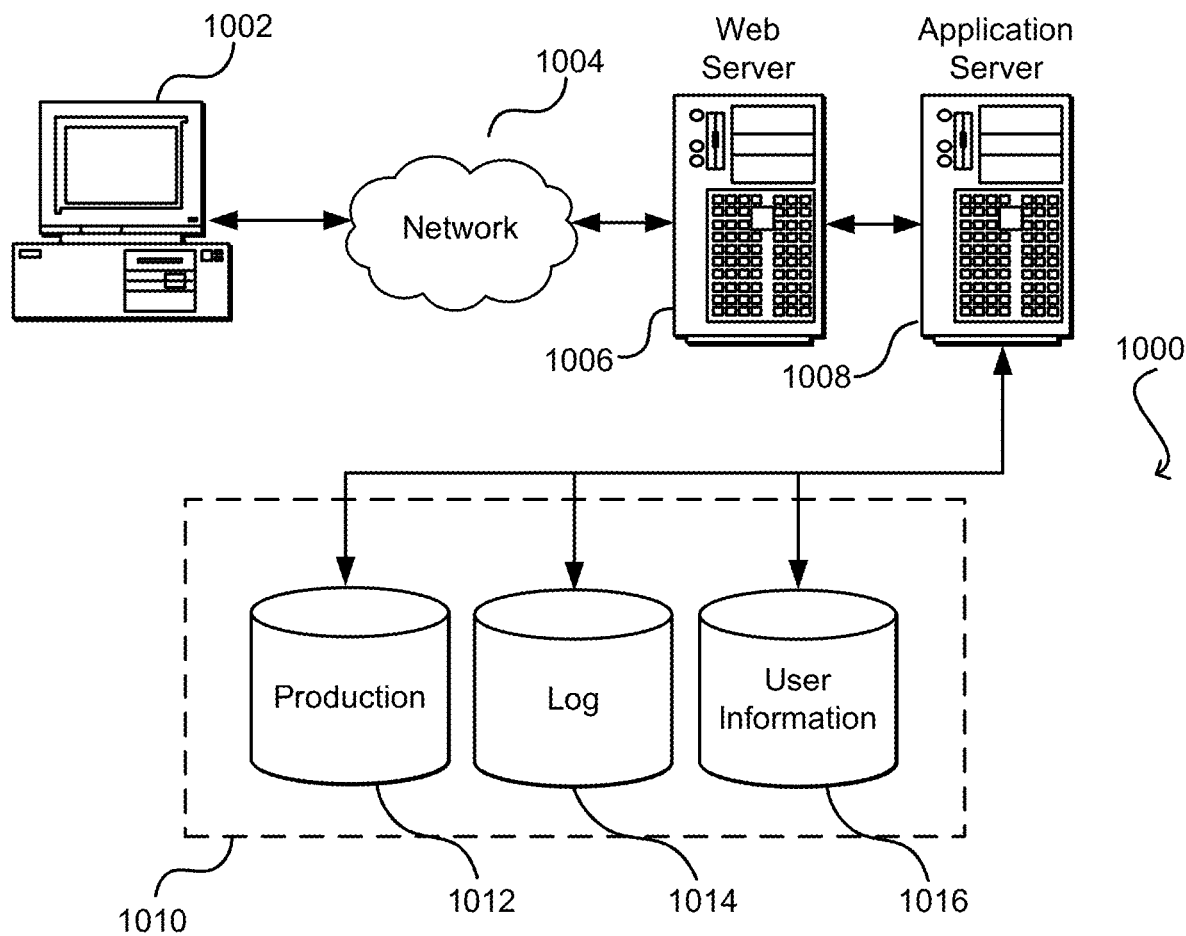
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A computer-implemented method, comprising:
receiving, by a video synthesis system, a video file that includes a sequence of shots, a particular shot of the sequence of shots including a sequence of frames, a first frame of the sequence of frames showing a portion of a face of a particular person, the portion including lips of the face, the particular shot showing the particular person speaking a message in a first language;

receiving, by the video synthesis system, an audio file that includes audio content corresponding to the message being spoken in a second language;

identifying, by the video synthesis system, the face of the particular person within the first frame;

determine, by the video synthesis system, first facial parameters of a first three-dimensional model of the face of the particular person from the first frame, the first facial parameters including at least one of shape, pose, or expression parameters;

determining, by the video synthesis system, second facial parameters of the first three-dimensional model of the face based at least in part on the audio file;

generating, by the video synthesis system, third facial parameters of a second three-dimensional model of the face based at least in part on merging the second facial parameters with the first facial parameters;

identifying, by the video synthesis system, a region of the second three-dimensional model of the face that is associated with a difference between the first facial parameters and the second facial parameters, the region including the lips of the face and associated with a variability of expression of the face within the particular shot;

performing, by the video synthesis system, deferred neural rendering of the region of the second three-dimensional model shown in the first frame based at least in part on a neural texture that is associated with the sequence of frames of the particular shot;

blending, by the video synthesis system, the rendered region of the second three-dimensional model with the first frame; and outputting, by the video synthesis system, a second frame that replaces the first frame of the particular shot of the video file, the second frame showing the face of the particular person speaking the message in the second language.

2. The computer-implemented method of claim 1, wherein the second facial parameters include at least second expression parameters associated at least with lips of a voice that voiced the audio content in the second language, and wherein merging the second facial parameters with the first facial parameters includes replacing at least one of the expression parameters of the first facial parameters with at least one of the second expression parameters of the second facial parameters.

3. The computer-implemented method of claim 1, wherein the neural texture includes color data and structural data that are associated with a texture space of the particular shot.

4. The computer-implemented method of claim 1, wherein performing deferred neural rendering further comprises rendering at least one novel pixel for the rendered region based at least in part on the neural texture, the novel pixel associated with a first characteristic of the face that is also shown in a neighboring frame within the particular shot, and wherein the first characteristic is not originally shown in the first frame.

5. A computer device, comprising:
a memory comprising computer-executable instructions; and
one or more processors in communication with the memory and configured to access the memory and execute the computer-executable instructions to perform, at least:

determining first facial parameters of a face of a particular person from a first frame in a video shot, the video shot showing the particular person speaking a message;

determining second facial parameters of the face based at least in part on an audio file that corresponds to the message being spoken in a different way from as shown in the video shot;

generating third facial parameters of the face shown in the first frame based at least in part on merging the first facial parameters with the second facial parameters;

identifying a region of the face that is associated with a difference between the first facial parameters and the second facial parameters;

performing deferred neural rendering of the region of the face based at least in part on a neural texture that corresponds to a texture space of the video shot; and outputting a second frame that replaces the first frame of the video shot, the second frame showing the face of the particular person speaking the message in the different way.

6. The computer device of claim 5, wherein the video shot includes a sequence of frames that includes the first frame, and the neural texture is generated based at least in part on the sequence of frames of the video shot and including color data and structural data associated with the texture space of the video shot.

7. The computer device of claim 6, wherein performing the deferred neural rendering further comprises rendering at least one novel pixel for the rendered region based at least in part on the neural texture, the novel pixel associated with a first characteristic of the face that is also shown in a neighboring frame of the sequence of frames of the video shot, and wherein the first characteristic is not originally shown in the first frame.

8. The computer device of claim 5, wherein the first frame is one of a sequence of frames of the video shot, the sequence of frames respectively being updated to show the face of the particular person speaking the message in the different way.

9. The computer device of claim 8, wherein at least lip movements of the face shown in the updated sequence of frames are synchronized to match the message being spoken in the audio file.

10. The computer device of claim 5, wherein the first facial parameters correspond to a three-dimensional model of the face of the particular person, the first facial parameters including at least one of first shape, first pose, or first expression parameters, and wherein the second facial parameters include second expression parameters.

11. The computer device of claim 10, wherein merging the first facial parameters with the second facial parameters includes retaining the first shape and the first pose parameters of the first facial parameters and replacing the first expression parameters with the second expression parameters.

12. The computer device of claim 10, wherein the first expression parameters and the second expression parameters, respectively, are associated with at least one of: (I) lip movement, (II) eye movement, (III) cheek movement, or (IV) brow movement, and wherein the message being spoken in the different way is associated with a difference between the first expression parameters and the second expression parameters.

13. The computer device of claim 5, wherein identifying the region of the face is based at least in part on a neural network that is trained to determine variability of expression of the face between a way the particular person speaks the message in the first frame and the different way the message is spoken in the audio file at a point in time that corresponds to the first frame in the video shot.

14. The computer device of claim 5, wherein the second facial parameters are also determined based at least in part on a subtitles file, the subtitles file indicating at least one of: (I) sounds of the message being spoken in the different way according to a time cadence associated with the video shot, or (II) a regional context associated with the message being spoken in the different way.

15. The computer device of claim 5, wherein at least one of the second facial parameters are determined based at least in part on at least one of: (I) an intonation, (II) a pitch, (III) tone, or (IV) a timbre of a voice that spoke the message in the different way.

16. One or more non-transitory computer-readable storage media comprising computer-executable instructions that, when executed by one or more processors, cause the one or more processors to perform, at least:
- determining first facial parameters of a face of a particular person from a first frame in a video shot, the video shot showing the particular person speaking a message;
- determining second facial parameters of the face based at least in part on an audio file that corresponds to the message being spoken in a different way from as shown in the video shot;
- generating third facial parameters of the face shown in the first frame based at least in part on merging the first facial parameters with the second facial parameters;
- identifying a region of the face that is associated with a difference between the first facial parameters and the second facial parameters;
- performing deferred neural rendering of the region of the face based at least in part on a neural texture that corresponds to a texture space of the video shot; and
- outputting a second frame that replaces the first frame of the video shot, the second frame showing the face of the particular person speaking the message in the different way.

17. The one or more non-transitory computer-readable storage media of claim 16, wherein the instructions further comprise:
- extracting one or more phonemes from the audio file that are time-aligned to the first frame in the video shot; and
- determining, one or more visemes, respectively, for the one or more phonemes; and
- determining the second facial parameters based at least in part on the one or more visemes.

18. The one or more non-transitory computer-readable storage media of claim 16, wherein the video shot is one of a plurality of video shots of a video title, the video shot corresponding to a sequence of frames captured between two cuts of the video title.

19. The one or more non-transitory computer-readable storage media of claim 16, wherein the instructions further comprise:
- identifying a background of the first frame; and
- blending the rendered region of the face with the background of the first frame.

20. The one or more non-transitory computer-readable storage media of claim 16, wherein the instructions further comprise:
- determining, from the first frame in the video shot, fourth facial parameters of a different face of a different person, the video shot also showing the different person speaking a second message in a second way;
- determining fifth facial parameters based at least in part on a second audio file that corresponds to the second message being spoken differently from the second way;
- generating sixth facial parameters of a three-dimensional model of the different face of the different person based at least in part on merging the fifth facial parameters with the fourth facial parameters;
- performing deferred neural rendering of a second region of the different face; and
- outputting the second frame that shows both the face of the particular person speaking the message in the different way and the different person speaking the second message differently from the second way.

* * * * *